US008695787B2

(12) United States Patent
Bell et al.

(10) Patent No.: US 8,695,787 B2
(45) Date of Patent: Apr. 15, 2014

(54) GUIDE RAIL SYSTEM

(75) Inventors: Glen A. Bell, Waterloo (CA); Daniel J. Turner, Kitchener (CA); Edward P. Kozak, Alma (CA)

(73) Assignee: Septimatech Group Inc., Waterloo, Ontario (CA)

( * ) Notice: Subject to any disclaimer, the term of this patent is extended or adjusted under 35 U.S.C. 154(b) by 0 days.

(21) Appl. No.: 13/592,761

(22) Filed: Aug. 23, 2012

(65) Prior Publication Data
US 2013/0075236 A1 Mar. 28, 2013

Related U.S. Application Data

(60) Provisional application No. 61/539,364, filed on Sep. 26, 2011.

(51) Int. Cl.
*B65G 21/20* (2006.01)
(52) U.S. Cl.
CPC .................. *B65G 21/2072* (2013.01); *B65G 21/2063* (2013.01)
USPC ...................... 198/836.3; 198/836.1
(58) Field of Classification Search
USPC .......................... 198/836.1, 836.3
See application file for complete search history.

(56) References Cited

U.S. PATENT DOCUMENTS

| | | | |
|---|---|---|---|
| 3,527,336 A | 9/1970 | Johnston | |
| 4,982,835 A | 1/1991 | Butler et al. | |
| 5,211,280 A | 5/1993 | Houde | |
| 5,291,988 A | 3/1994 | Leonard | |
| 5,492,218 A | 2/1996 | Falkowski | |
| 5,515,668 A | 5/1996 | Hunt et al. | |
| 5,517,798 A | 5/1996 | Klopfenstein | |
| 5,638,659 A | 6/1997 | Moncrief et al. | |
| 5,682,976 A | 11/1997 | Jorgensen | |
| 5,782,339 A | 7/1998 | Drewitz | |
| 5,819,911 A | 10/1998 | Ledingham | |
| 5,860,511 A | 1/1999 | Ensch et al. | |
| 5,992,616 A | 11/1999 | Kliesow et al. | |
| 6,050,396 A | 4/2000 | Moore | |
| 6,360,880 B1 | 3/2002 | Ouellette | |
| 6,378,695 B1 | 4/2002 | Rinne | |
| 6,454,084 B2 | 9/2002 | Csiki et al. | |
| 6,533,110 B1 | 3/2003 | Ledingham | |
| 6,578,702 B2 | 6/2003 | Falkowski | |
| 6,827,205 B2 | 12/2004 | Ledingham | |
| 6,889,823 B2 * | 5/2005 | Delaporte et al. | 198/836.3 |
| 7,310,983 B2 | 12/2007 | Schill et al. | |
| 7,431,150 B2 | 10/2008 | Ranger | |
| 7,530,453 B2 * | 5/2009 | Ingraham | 198/836.3 |
| 7,721,876 B2 | 5/2010 | Hartness et al. | |
| 8,186,503 B1 | 5/2012 | Burchell et al. | |
| 8,490,780 B2 * | 7/2013 | Bell et al. | 198/836.3 |

(Continued)

*Primary Examiner* — James R Bidwell

(57) ABSTRACT

A guide rail system for guiding containers in preselected positions on one or more conveyors. The guide rail system has inner and outer subsystems for locating the containers on the conveyor. The inner subsystem includes one or more offset adjustable point devices, each located at a preselected offset location adjacent to a straight segment of the conveyor and spaced apart from a boundary between it and a curved segment by a preselected distance. The inner subsystem also has one or more first and second transition rail portions, each mounted to said at least one offset adjustable point device, for engaging the containers as they are moved on the straight segment and the curved segment respectively. The first and second transition rail portions are positionable by the offset adjustable point device to locate the containers in the preselected positions.

30 Claims, 28 Drawing Sheets

(56) References Cited

U.S. PATENT DOCUMENTS

| | | |
|---|---|---|
| 2002/0189923 A1 | 12/2002 | Ledingham |
| 2003/0164280 A1 * | 9/2003 | Delaporte et al. ......... 198/836.3 |
| 2006/0144015 A1 | 7/2006 | Cash, III et al. |
| 2011/0079493 A1 | 4/2011 | Bell et al. |
| 2012/0103763 A1 | 5/2012 | Bell et al. |

* cited by examiner

GUIDE RAIL SYSTEM

This application claims the benefit of U.S. Provisional Application No. 61/539,364, filed on Sep. 26, 2011, which is hereby incorporated by reference herein in its entirety.

FIELD OF THE INVENTION

This invention is related to a guide rail system for guiding containers in preselected positions on a conveyor along which the containers are moved.

BACKGROUND OF THE INVENTION

Conventional guide rails are fixed in position along a conveyor to guide containers as the conveyor moves the containers past the guide rails. For example, the containers may be bottles, boxes or jars into which a product is to be placed, or which are to be further processed (e.g., capping, label application, or packaging), as is well known in the art. Also, the item conveyed may be part of a package, e.g., a cap or closure for a bottle or can. For the purposes of this application, it will be understood that "container" refers to bottles, boxes, jars, cans, and other vessels for holding materials, as well as caps or closures for such vessels. Many different types of conveyors are known, e.g., table-top conveyors, roller conveyors, belt conveyors, beaded conveyors, and air-veyors. Typically, the conveyor moves the container relatively rapidly past the guide rails. Ideally, the guide rails are formed and positioned so that the containers are gently and precisely guided between the guide rails, as is known.

However, the fixed conventional guide rails cannot easily be changed if the shape and/or dimensions of the containers which are to be guided thereby change. In particular, quick adjustment of guide rails in segments of conveyors that define relatively sharp corners is generally not available in the prior art.

Adjustable guide rail systems are known, but they have a number of disadvantages. For instance, in one known system, the guide rail is positionable closer to, or further away from, a conveyor in predetermined increments determined by blocks which are insertable to position the guide rail. This arrangement, however, does not provide the flexibility which may be needed, because the guide rails can only be positioned in certain positions, according to the sizes of the blocks. Because the blocks only permit changes in the positions of the guide rails in predetermined increments, this prior art system cannot accommodate all changes in position. Also, in this prior art arrangement, changing the positions of the guide rails is relatively time-consuming.

In another known adjustable guide rail, an adjustment to the guide rail's position is made by using compressed air acting on cylinders, but this prior art system requires that the necessary air pressure be maintained, to hold the guide rail in a required position relative to the conveyor. Also, the ability of this prior art system to accommodate different container sizes is limited.

Because the adjustable guide rails typically are made up of a number of relatively short guide rail portions, each of which is mounted separately on its own support bracket, and because each of the guide rail portions is moved on its support bracket independently of the other guide rail portions, adjusting the known adjustable guide rail systems for different containers tends to be a time-consuming, and sometimes difficult, job.

It is important that the guide rails be accurately positioned relative to the conveyor, and the containers thereon. For instance, if the containers are not properly positioned by the guide rails, the containers may "shingle", or jam, frequently. Also, where the containers are guided into equipment in which the containers are processed or acted on (e.g., fillers, or labeling machines), if the containers are not properly positioned, they will not be properly processed. In general, the accuracy of the adjustable guide rail systems of the prior art is not particularly good.

SUMMARY OF THE INVENTION

For the foregoing reasons, there is a need for an improved guide rail system that overcomes or mitigates one or more of the disadvantages of the prior art.

In its broad aspect, the invention provides a guide rail system for guiding containers in preselected positions on one or more conveyors on which the containers are moved. The conveyor has one or more straight segments and one or more curved segments. Each of the straight segments and each of the curved segments are substantially aligned with each other at a boundary therebetween. The guide rail system has inner and outer subsystems for locating the containers on the conveyor positioned proximal to inner and outer sides of the curved segment respectively. The inner subsystem includes one or more offset adjustable point devices, each located at a preselected offset location adjacent to the straight segment and spaced apart from the boundary by a preselected distance. The inner subsystem also includes one or more first transition rail portions, each mounted to said at least one offset adjustable point device for engaging the containers as they are moved on said at least one straight segment, and one or more second transition rail portions, each mounted to the offset adjustable point device for engaging the containers as they are moved on the curved segment. The first transition rail portion and the second transition rail portion are locatable by the offset adjustable point device for engaging the containers, to locate the containers in the preselected positions on said at least one conveyor.

In another aspect, the offset adjustable point device includes one or more adjustment elements, each transversely movable relative to the conveyor. Each of the first transition rail portion and the second transition rail portion are connected to the adjustment element. The first transition rail portion has one or more first transition rail contact surfaces, for engagement with the containers, and the second transition rail portion has one or more second transition rail contact surfaces, for engagement with the containers.

In another aspect, the invention provides one or more first side subsystems, each positioned proximal to a first side of the straight segment which is adjacent to the inner side of the curved segment at the boundary line, the first side subsystem having one or more first side straight rail portions having a first side rail contact surface for engaging the containers. Also, the inner subsystem includes a number of inner slip rail portions, each inner slip rail portion having an inner contact surface for engaging the containers. Each slip rail portion is substantially transversely movable relative to the conveyor.

In yet another of its aspects, the invention provides one or more transition posts, each attached to an offset adjustment element, and the first transition rail portion and the second transition rail portion are attached to the transition post. The transition post is positionable by the offset adjustment element relative to the conveyor to locate the first transition rail portion and the second transition rail portion for engaging the first transition rail contact surface and the second transition rail contact surface respectively with the containers, to locate the containers in the preselected positions on the conveyor.

In another aspect, the first transition rail portion, the second transition rail portion, the first side straight rail portion, and the inner slip rail portions are transversely movable relative to the conveyor by one or more selected distances.

In another aspect, the first transition rail portion, the second transition rail portion, the first side straight rail portion, and the inner slip rail portions are substantially simultaneously movable relative to the conveyor by the selected distance(s).

In another of its aspects, the invention provides one or more support devices for supporting at least a selected one of the inner slip rail portions, the first transition rail portion, and the second transition rail portion.

BRIEF DESCRIPTION OF THE DRAWINGS

The invention will be better understood with reference to the attached drawings, in which.

DETAILED DESCRIPTION

Figure 1:
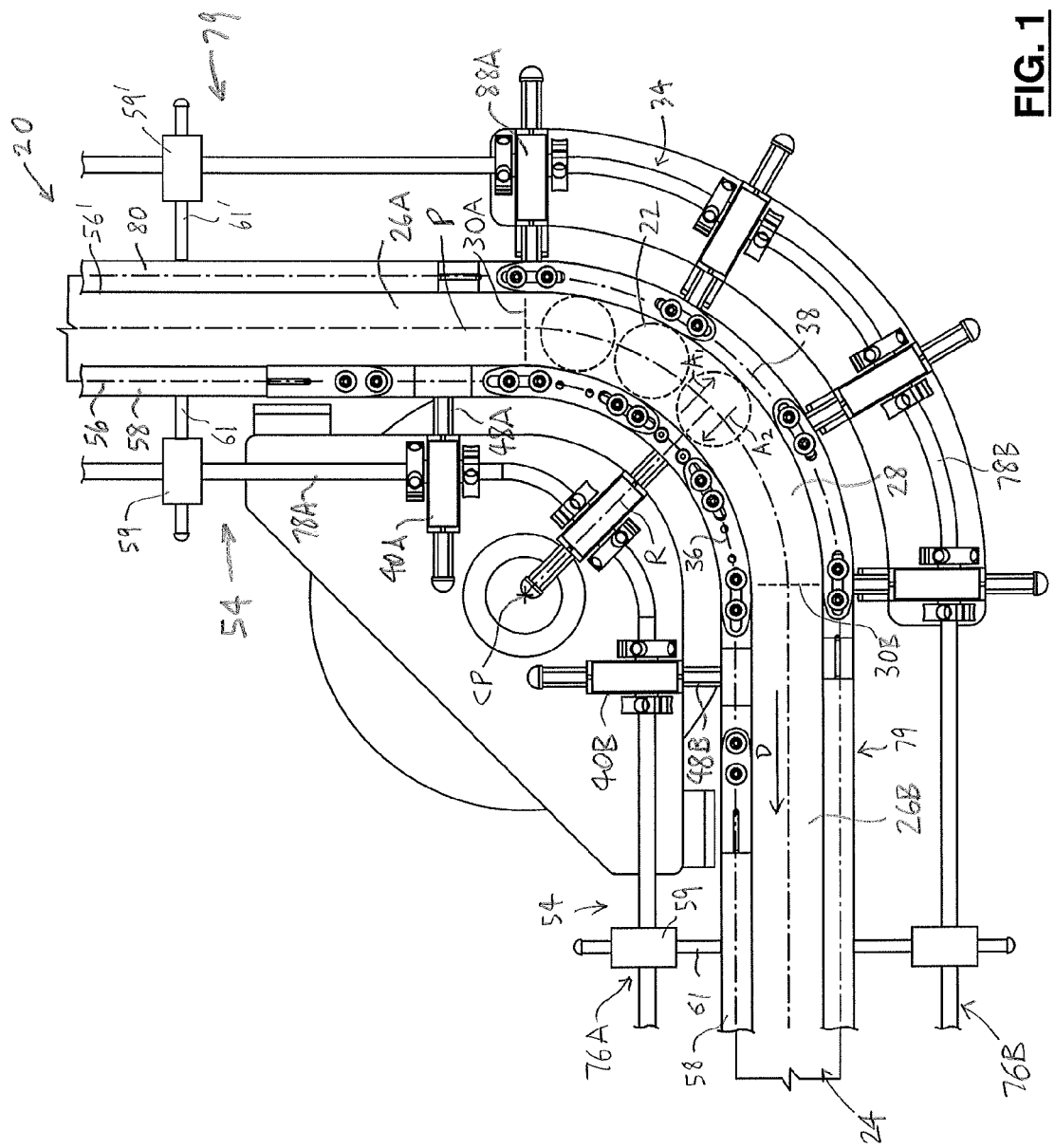
FIG. 1 is a top view of an embodiment of a guard rail system of the invention including inner and outer subsystems, in which adjustment elements thereof are shown in an extended position.

In the attached drawings, like reference numerals designate corresponding elements throughout. Reference is first made to FIGS. 1-9 to describe an embodiment of a guide rail system of the invention referred to generally by the numeral 20. The guide rail system 20 is for guiding containers 22 in preselected positions on one or more conveyors 24 (FIG. 1) on which the containers 22 are moved, as will be described. In one embodiment, the conveyor 24 preferably includes one or more straight segments 26 and one or more curved segments 28 substantially aligned with each other at a boundary 30 therebetween. As can be seen in FIGS. 1A and 1B, the guide rail system 20 preferably includes inner and outer subsystems 32, 34 (FIGS. 1, 4) for locating the containers 22 on the conveyor 24 positioned proximal to inner and outer sides 36, 38 of the curved segment 28 respectively. It is also preferred that the inner subsystem 32 includes one or more offset adjustable point devices 40, each such device 40 being located at a preselected offset location adjacent to the straight segment 26 and spaced apart from the boundary 30A, 30B by a preselected distance 42A, 42B (FIG. 2), as will also be described. Preferably, the inner subsystem 32 also includes one or more first transition rail portions 44 mounted to the offset adjustable point device 40 for engaging the containers 22 as they are moved on the straight segment 26, and one or more second transition rail portions 46 mounted to the offset adjustable point device 40 for engaging the containers 22 as they are moved on the curved segment 28. The first transition rail portion 44 and the second transition rail portion 46 are locatable by the offset adjustable point device 40 for engaging the containers 22, to maintain the containers 22 in the preselected positions on the conveyor 24.

Figure 5:
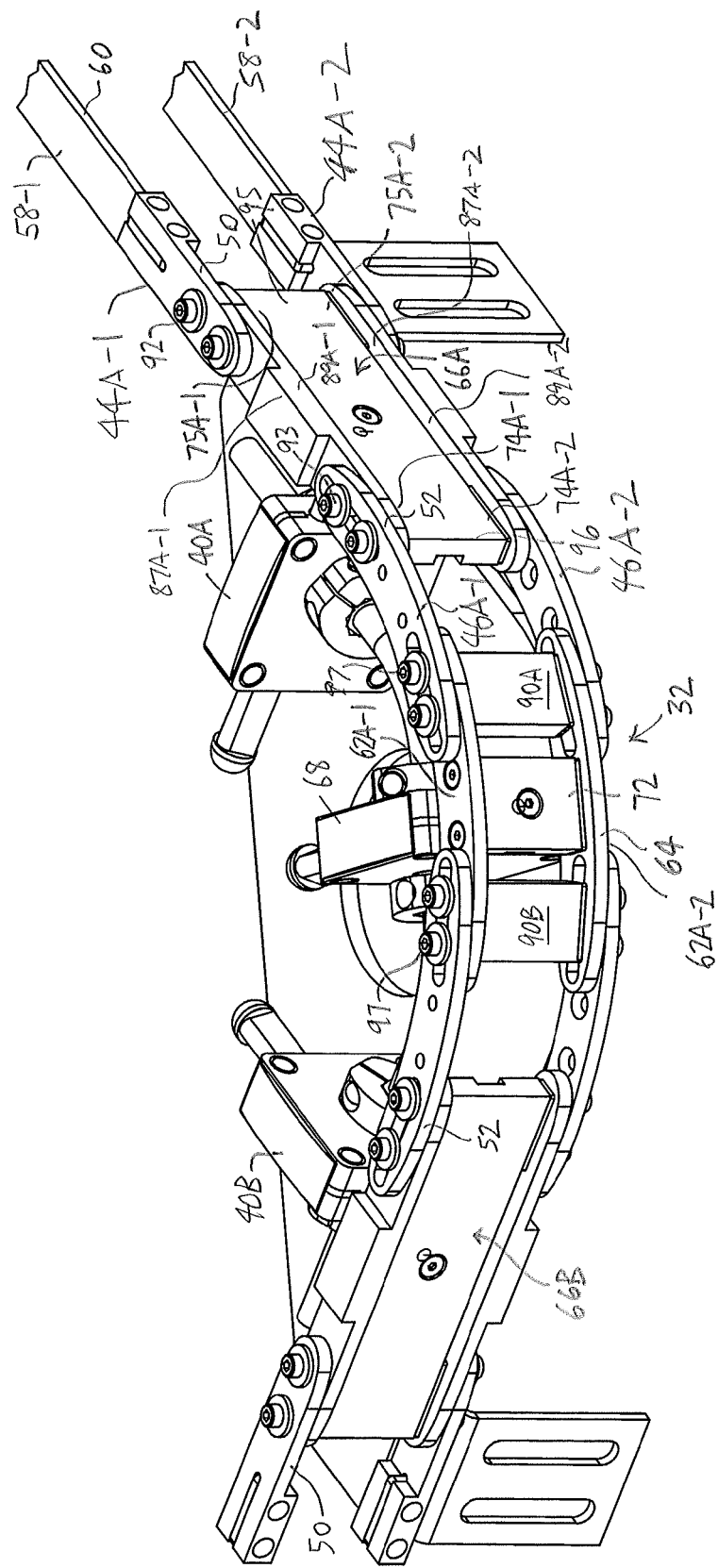
FIG. 5 is an isometric view of the inner subsystem of the guide rail system of FIG. 1.

In one embodiment, the offset adjustable point device 40 preferably includes one or more adjustment elements 48 (FIG. 3) transversely movable relative to the conveyor 24, as will be described. Preferably, each of the first transition rail portion 44 and the second transition rail portion 46 are connected to the adjustment element 48 (FIG. 5). As can be seen in FIG. 5, the first transition rail portion 44 preferably includes one or more first transition rail contact surfaces 50, for engagement with the containers 22, and the second transition rail portion 46 also preferably includes one or more second transition rail contact surfaces 52, for engagement with the containers 22. Those skilled in the art would be aware of the manner in which the adjustment element 48 is mounted in the offset adjustable point device 40. For instance, examples of adjustment elements mounted in adjustable point devices are described in detail in U.S. patent application Ser. No. 12/897,418, which is hereby incorporated by reference herein in its entirety.

It is also preferred that the guide rail system 20 additionally includes one or more first side subsystems 54 (FIG. 2) positioned proximal to a first side 56 (FIG. 1) of the straight segment 26 which is adjacent to the inner side 36 of the curved segment 28 at the boundary 30. Preferably, the first side subsystem 54 includes one or more first side straight rail portions 58 having a first side rail contact surface 60 (FIG. 5) for engaging the containers 22. It is also preferred that the inner subsystem 32 also includes a number of inner slip rail portions 62 (FIG. 3), each of the inner slip rail portions 62 having an inner contact surface 64 (FIG. 5) respectively for engaging the containers 22. Preferably, each of the slip rail portions is substantially transversely movable relative to the conveyor 24, as will also be described.

Figure 4:
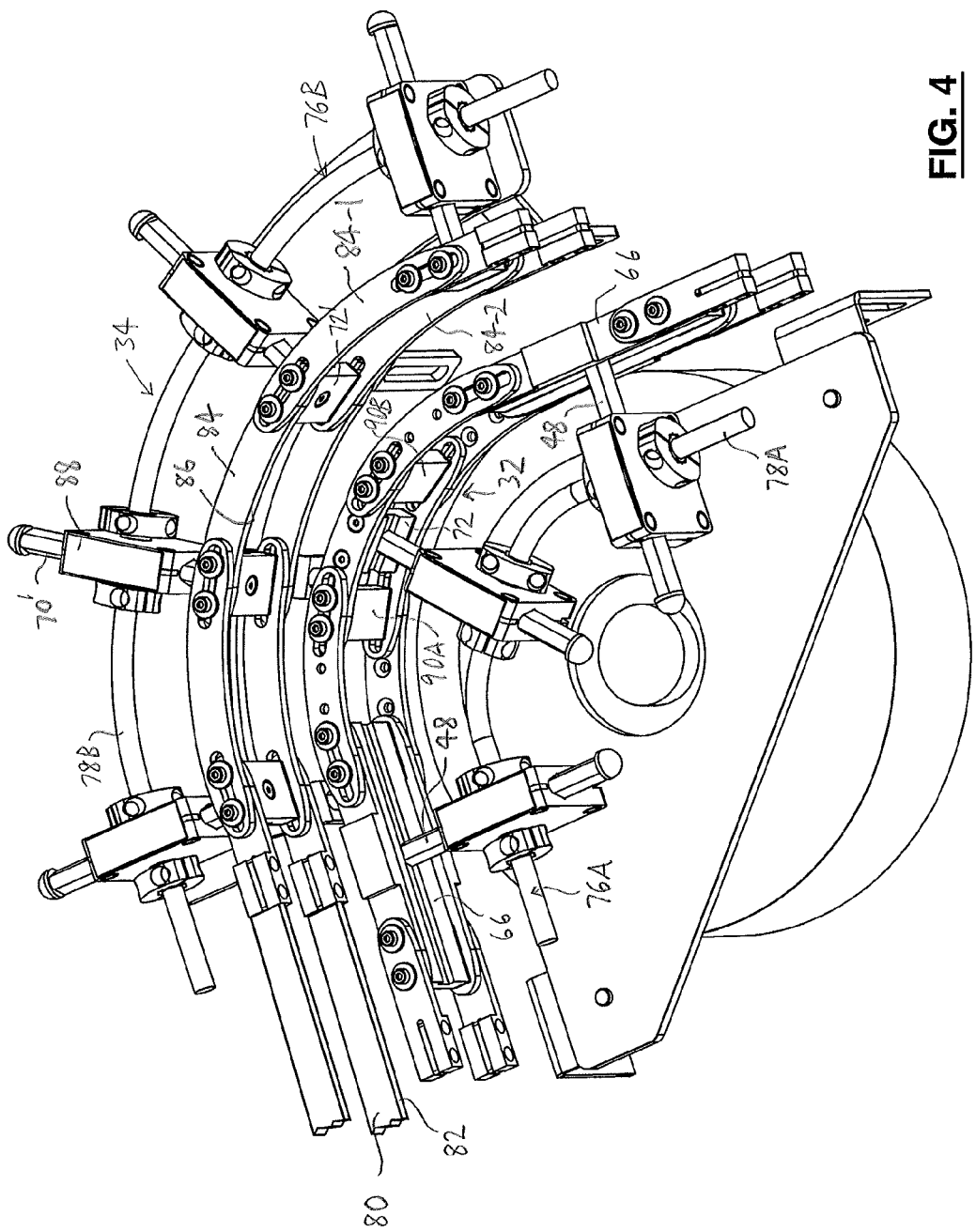
FIG. 4 is an isometric view of the guide rail system of FIG. 1.

As can be seen in FIG. 4, the guide rail system 20 preferably also includes a transition post 66 attached to the offset adjustment element 48. Preferably, the first transition rail portion 44 and the second transition rail portion 46 are attached to the transition post 66. It will be understood that the transition post 66 is positionable by the offset adjustment element 48 relative to the conveyor 24 to locate the first transition rail portion 44 and the second transition rail portion 46 for engaging the first transition rail contact surface 50 and the second transition rail contact surface 52 respectively with the containers 22, to maintain the containers 22 in the preselected positions on the conveyor 24.

As shown in FIG. 1, the first transition rail contact surface 50 preferably is at least partially aligned with the first side rail contact surface 60. Also, the second transition rail contact surface 52 is at least partially aligned with at least a selected one of the inner contact surfaces 64 located adjacent to the second transition rail contact surface 52.

As can be seen in FIG. 1, the inner and outer subsystems 32, 34 are positioned to locate the containers 22 on a path "P" that is located equidistant from the inner and outer subsystems 32, 34. It will be understood that, when the containers 22 are substantially centered on the path P, the containers 22 are in the preselected positions therefor on the conveyor 24.

Along the length of the curved segment 28, the path "P" is defined by a radius "R" (FIG. 1). The radius R extends between a center point "CP" and the path P. As will be described, the guide rail system 20 is adapted for use where the path "P" has a radius "R" that is relatively small, e.g., less than about five inches (12.7 cm). Those skilled in the art would appreciate that the guide rail system 20 may also be used where the radius "R" is greater than about five inches (12.7 cm).

It will also be understood that only three containers 22 are shown in FIG. 1 for clarity of illustration. Those skilled in the art will appreciate that, when the conveyor 24 and the guide rail system 20 are in use, the containers 22 substantially fill the region between the inner and outer subsystems 32, 34.

For clarity of illustration, the direction of travel of the containers 22 on the conveyor 24 is indicated by arrow "D" in FIG. 1. However, it will be understood that the guide rail system 20 may be used regardless of whether the containers 22 are moved in the direction indicated by arrow "D" or in the opposite direction.

Those skilled in the art will appreciate that, in practice, one or more conveyors 24 may be positioned end-to-end, e.g., to provide a particular configuration. In practice, various numbers of conveyors may be positioned in selected arrangements, depending on a variety of factors. For the purposes hereof, reference is generally made to only one conveyor for convenience, but it will be understood that the description is equally applicable to configurations involving more than one conveyor.

For instance, in the arrangement illustrated in FIG. 1, the curved segment 28 is positioned between two straight segments, identified for convenience in FIG. 1 as 26A and 26B. In FIG. 1, the curved segment 28 is positioned between the two straight segments 26A, 26B that are positioned substantially orthogonally to each other, and the inner and outer subsystems are formed accordingly. However, those skilled in the art will appreciate that the curved segment may be positioned between straight segments located relative to each other in various positions, and the inner and outer subsystems are formed accordingly.

Figure 3:
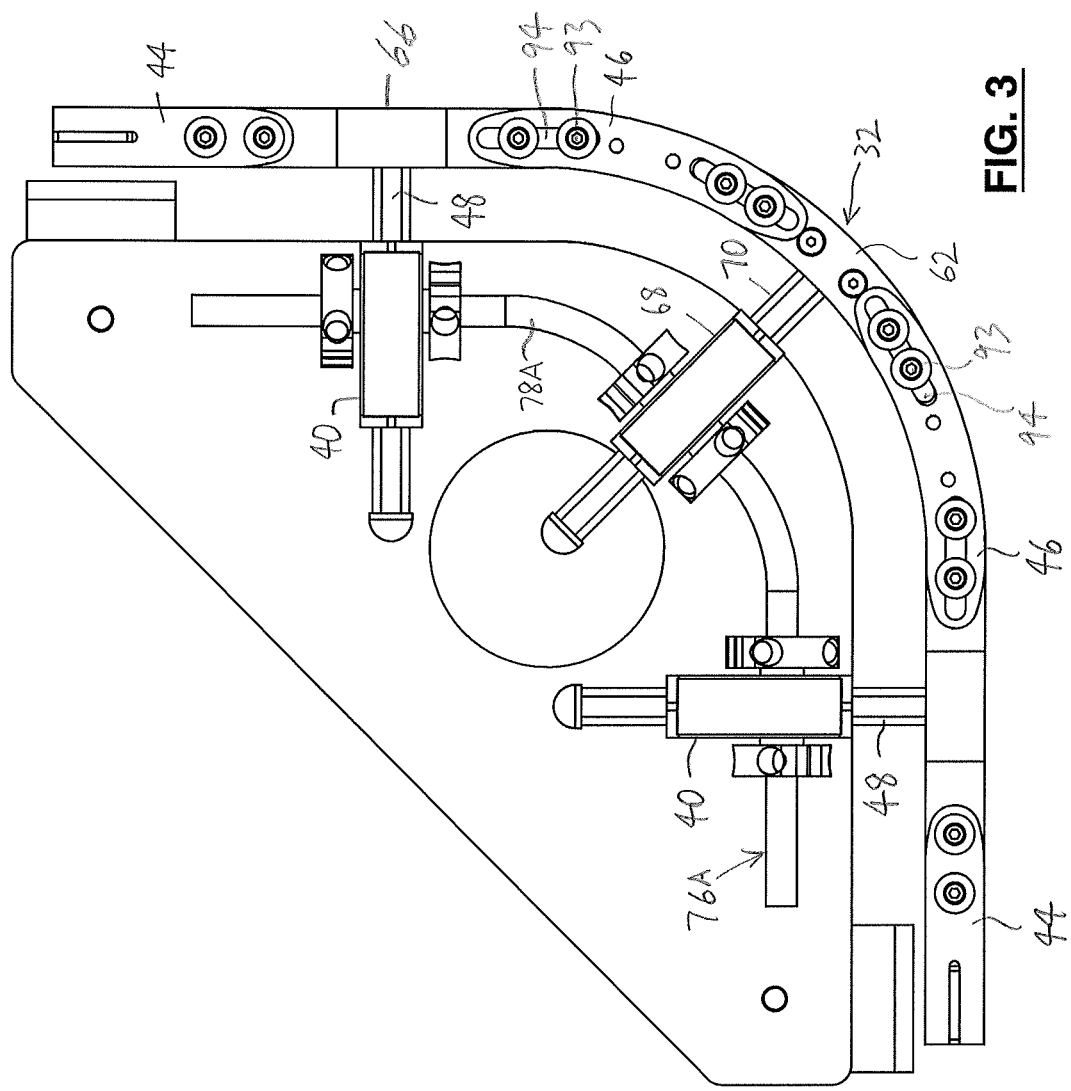
FIG. 3 is a top view of the guard rail system of FIG. 2 in which the adjustment elements are shown in extended positions, drawn at a larger scale.

As can be seen in FIG. 3, the inner subsystem 32 preferably includes an inner adjustable point device 68 with an adjustment element 70 mounted therein. (As noted above, those skilled in the art will be aware of the manner in which the adjustment element 70 is mounted in the inner adjustable point device 68.) In one embodiment, a central post 72 preferably is attached to the adjustment element 70 (FIG. 5). Such attachment preferably is effected using any suitable fastening means. Preferably, an upper inner slip rail portion 62A-1 is attached to the central post 72 at its upper end, and a lower inner slip rail portion 62A-2 is attached to the central post 72 at its lower end (FIG. 5). As can be seen, for example, in FIG. 5, in one embodiment, it is preferred that the slip rail portions are arranged in two sets, i.e., an upper set and a lower set.

Those skilled in the art will appreciate that, alternatively, the inner subsystem 32 may include only one set of first side straight rail portions and slip rail portions (i.e., substantially at only one elevation), or more than two such sets.

As can also be seen in FIG. 5, the inner subsystem 32 illustrated therein preferably includes two offset adjustable point devices, identified for convenience by reference numerals 40A and 40B. For convenience, the adjustment elements mounted therein are identified by reference numerals 48A and 48B respectively, and the transition posts connected to such adjustment elements are identified by reference numerals 66A and 66B (FIGS. 1, 5). It will be understood that the offset adjustment point devices 40A, 40B and the elements connected thereto respectively (directly and indirectly) are the same, in all material respects. Accordingly, in the following description, only the operation of the offset adjustable point device 40A is described in detail.

The inner subsystem 32 includes first transition rail portions identified for convenience by reference numerals 44A-1 and 44A-2, each attached to the transition post 66A at its end proximal to the straight segment 26A, and second transition rail portions identified for convenience by reference numerals 46A-1 and 46A-2, each attached to the transition post 66A at its end proximal to the curved segment 28 (FIG. 5). As can be seen in FIG. 5, in the embodiment illustrated therein, each of the second transition rail portions 46A-1, 46A-2 is slidably attached to one of the inner slip rail portions 62A-1, 62A-2. For instance, at upper and lower second ends 74A-1, 74A-2 thereof, the second transition rail portions 46A-1, 46A-2 are slidably attached respectively to the inner slip rail portions 62A-1, 62A-2.

However, each of the first transition rail portions 44A-1, 44A-2 is fixedly secured to the transition post 66A at its upper and lower first ends 75A-1, 75A-2. As will be described, this aspect is one of the features that permits the inner subsystem 32 to function properly when the rail portions are moved transversely relative to the conveyor 24.

From the foregoing, it can be seen that, in the embodiment described, the first and second transition rail portions 44A-1, 44A-2, 46A-1, and 46A-2 are mounted to the offset adjustable point device 40A indirectly, i.e., via the adjustment element 48A, and the transition post 66A. In addition, it can also be seen that the first and second transition rail portions 44A-1, 44A-2, 46A-1, and 46A-2 are connected to the adjustment element 48A indirectly, i.e., via the transition post 66A.

Similarly, the inner slip rail portions 62A-1, 62A-2 are mounted to the inner adjustable point device 68 indirectly, i.e., via the adjustment element 70, and the central post 72. Also, the inner slip rail portions 62A-1, 62A-2 are connected to the adjustment element 70 indirectly, i.e., via the central post 72.

Preferably, the first side subsystem 54 includes one or more adjustable point devices 59, and one or more adjustment elements 61 mounted in the adjustable point devices 59. It is also preferred that the first side straight rail portion(s) 58 are connected to the adjustment elements 61. As is known in the art, such connection may be indirect, e.g., via one or more posts (not shown).

The guide rail system 20 preferably includes devices for causing the adjustment elements to move substantially in unison. As can be seen, for instance, in FIGS. 2 and 3, the guide rail system 20 preferably includes one or more drive subsystems 76. For example, in FIGS. 1 and 4, the inner subsystem 32 is shown as being engaged by the inner drive subsystem 76A, and the outer subsystem 34 is shown as being engaged by the outer drive subsystem 76B. It is preferred that the drive subsystem 76A includes one or more drive elements 78A adapted to move, and to cause corresponding motion of the adjustment elements 48, 70. Preferably, the drive elements 78A are elongate, and the motion thereof is rotation about longitudinal axes thereof. The movement of the drive elements 78A may be initiated in various ways, as will be described. Those skilled in the art will be aware of the manner in which the drive elements are connected to the adjustable point devices, to cause movement of the adjustment elements mounted therein. For instance, such details are disclosed in U.S. patent application Ser. Nos. 12/897,418 and 13/285,540, each of which is incorporated by reference herein in its entirety.

The adjustment elements 48, 70 are movable transversely relative to the conveyor, within limits. The adjustment elements as shown in FIG. 1 are between fully retracted and fully extended positions, so they are movable outwardly or inwardly. For instance, in FIG. 1, the adjustment elements are shown in positions between the fully retracted and fully extended positions. As illustrated in FIG. 1, the adjustment element 70 is movable toward the conveyor 24 (i.e., toward the outer subsystem 34), in the direction indicated by arrow "$A_1$", and the adjustment element 70 is also movable away from the conveyor 24 (i.e., away from the outer subsystem 34), in the direction indicated by arrow "$A_2$".

Figure 2:
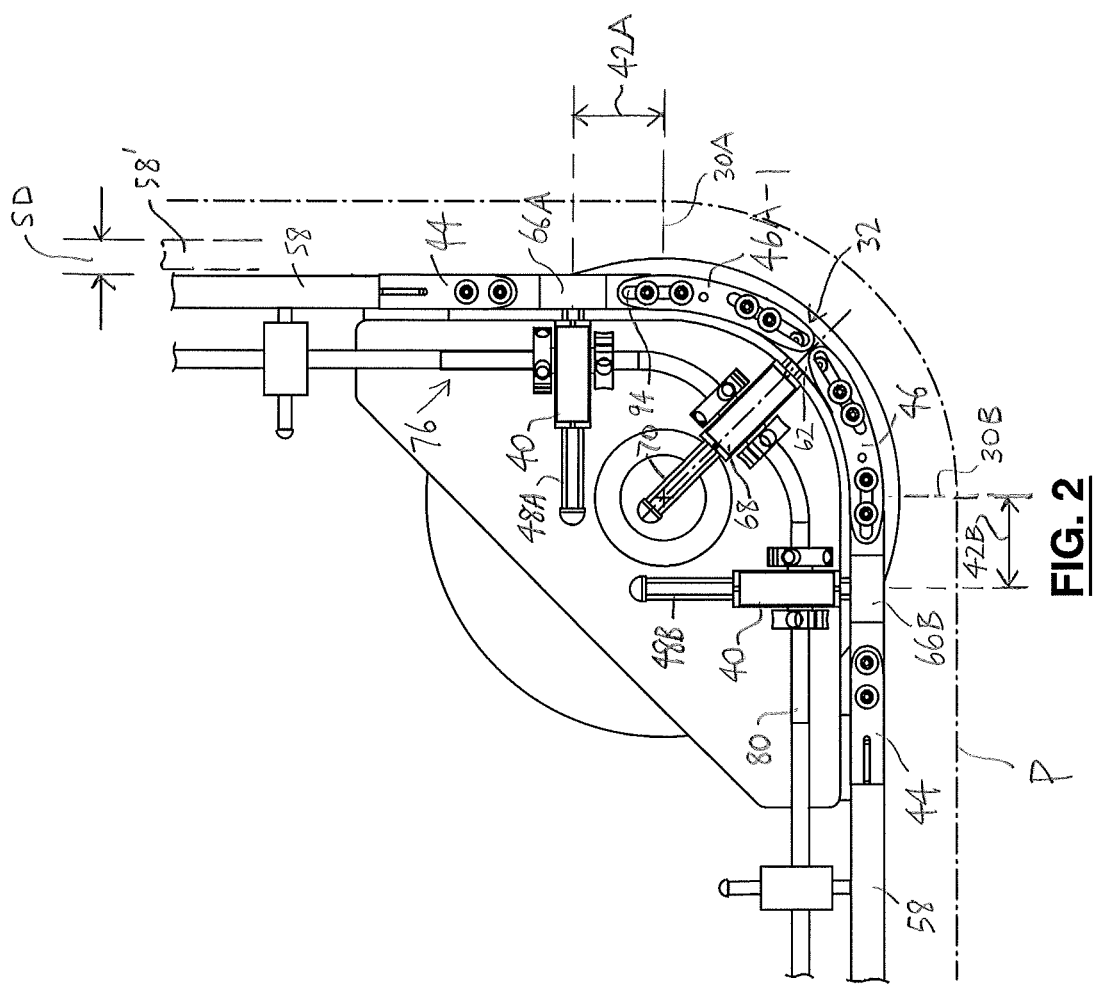
FIG. 2 is a top view of the guard rail system of FIG. 1 excluding the outer subsystem, in which the adjustment elements are shown in fully refracted positions.
Figure 6:
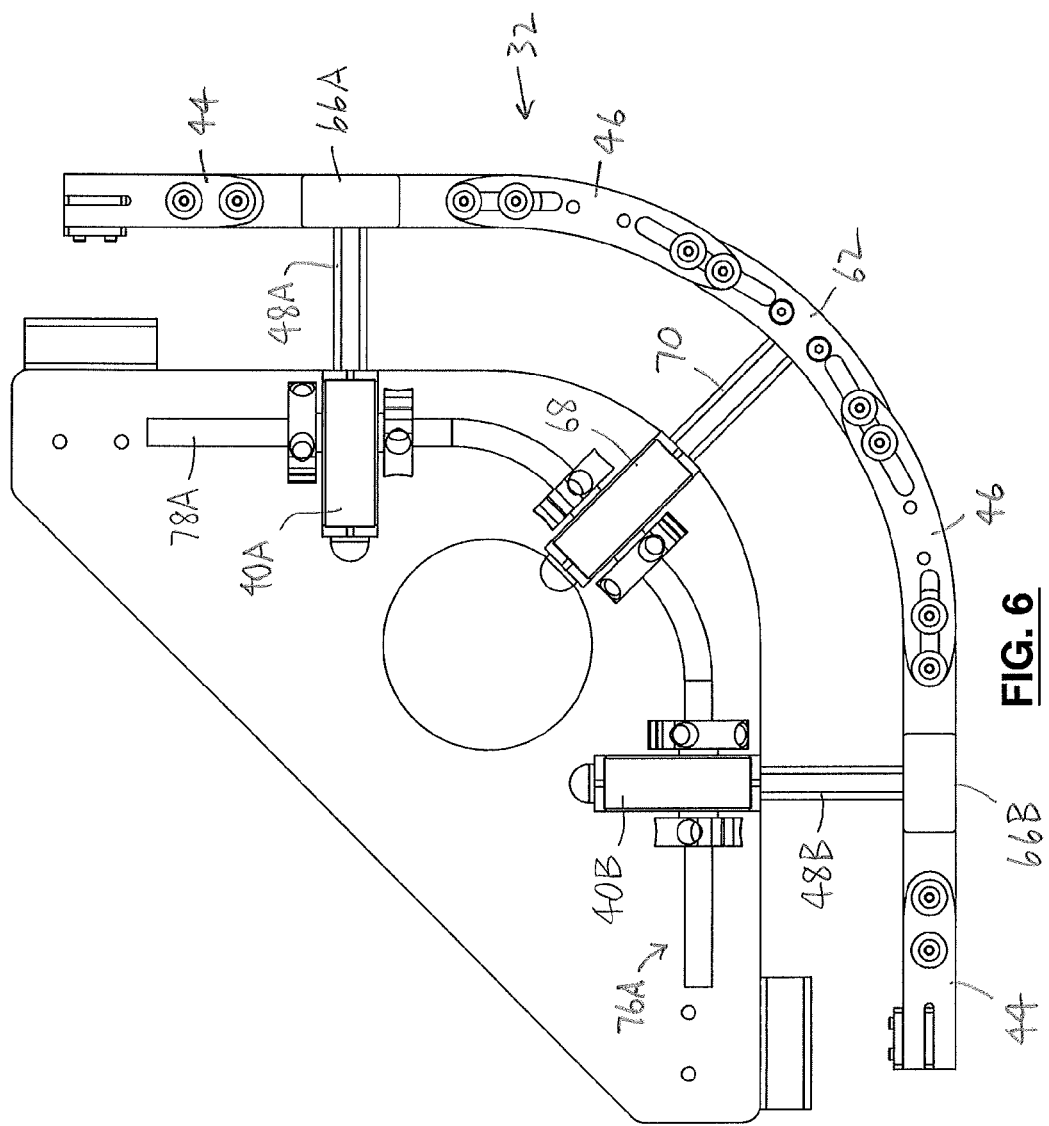
FIG. 6 is a side view of the inner subsystem of FIG. 5.

Those skilled in the art would appreciate that the adjustment elements are movable between the fully extended positions therefor and the fully extracted positions therefor, and are adapted to remain at any position therebetween. It will be understood that the adjustment elements 48A, 48B, and 70 are shown in FIG. 6 in fully extended positions, and the adjustment elements 48A, 48B, and 70 are shown in FIG. 2 in fully retracted positions. As described above, movement of the adjustment elements results in corresponding movement of the rail portions connected (indirectly or otherwise) therewith.

Figure 7:
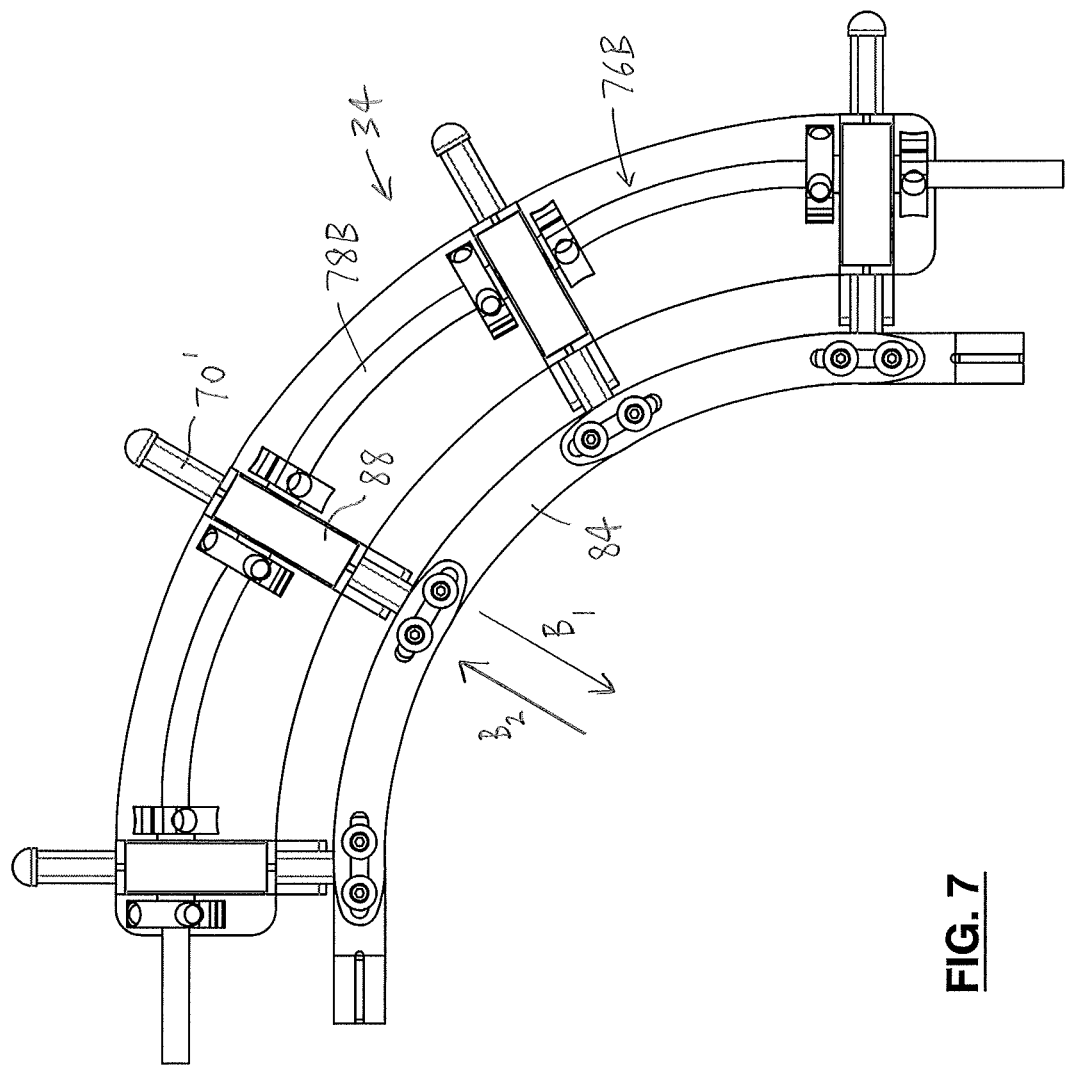
FIG. 7 is a top view of the outer subsystem of the guide rail system of FIG. 1.

As can be seen in FIGS. 1, 4, and 7, in one embodiment, the guide rail system 20 preferably includes one or more second side subsystems 79 positioned proximal to a second side 56' of the straight segment 26 which is positioned adjacent to the outer side 38 of the curved segment 28 at the boundary 30. Preferably, the second side subsystem 79 includes one or more second side straight rail portions 80, each of which has one or more second side rail contact surfaces 82 (FIG. 4) for engaging the containers 22. Preferably, the outer subsystem 34 includes one or more outer slip rail portions 84, each having one or more outer slip rail contact surfaces 86 (FIG. 4), for engaging the containers 22, to maintain the containers 22 in the preselected positions on the conveyor 24.

Preferably, the second side subsystem 79 also includes one or more adjustment elements 61' that are mounted in one or more adjustable point devices 59'. Also, the second straight rail portions 80 preferably are connected to the adjustment elements 61' (FIG. 1).

Figure 8:
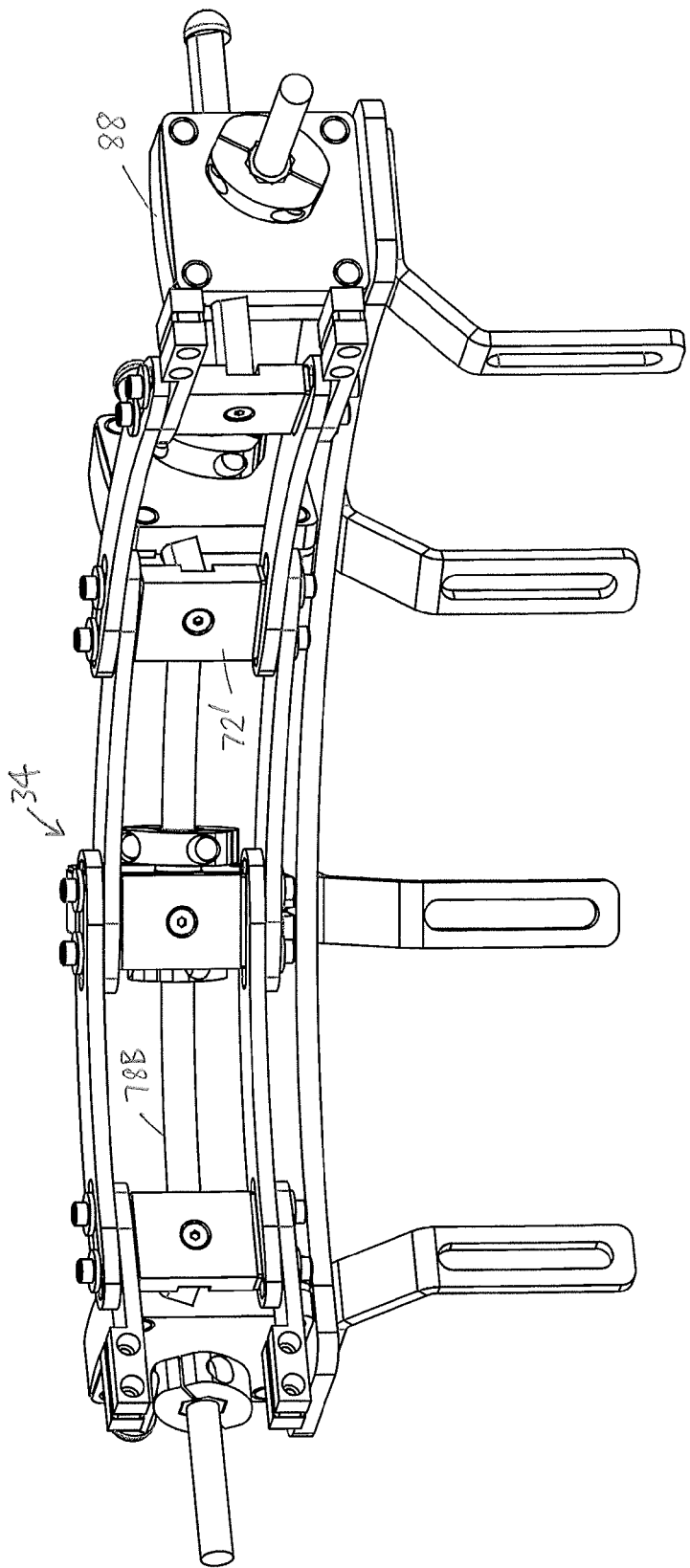
FIG. 8 is an isometric view of the outer subsystem of FIG. 7.
Figure 9:
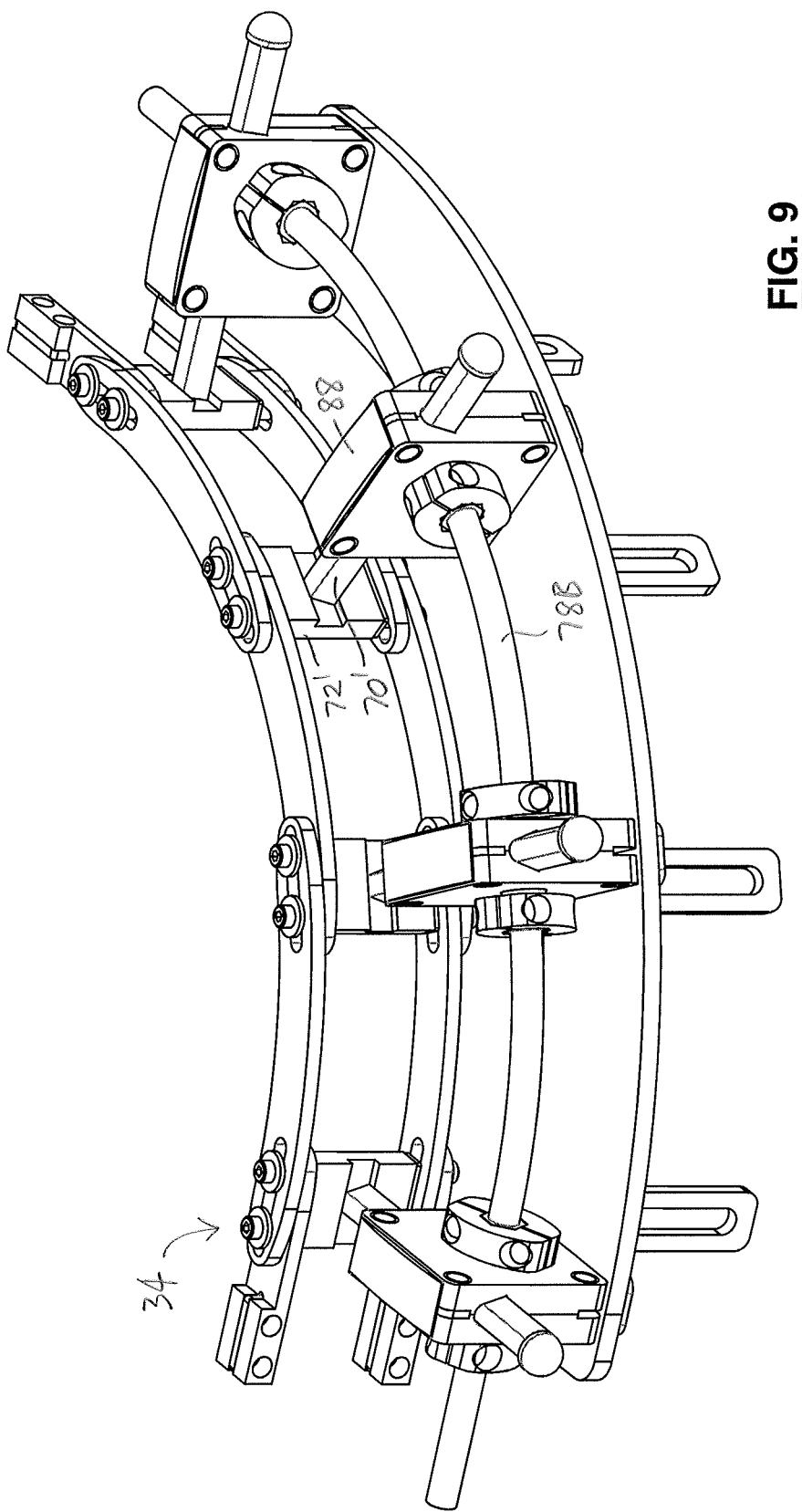
FIG. 9 is another isometric view of the outer subsystem of FIG. 7.

The outer subsystem 34 preferably includes one or more adjustable point devices 88 (FIG. 1). In addition, and as can be seen in FIGS. 4 and 7, the outer subsystem 34 preferably includes a number of adjustment elements 70' that are mounted in the outer adjustable point devices 88, and to which the outer slip rail portions 84 are connected. As can be seen in FIGS. 4 and 8, in one embodiment, it is preferred that the outer subsystem 34 includes a number of posts 72', each of which is secured to one of the adjustment elements 70'. Preferably, upper and lower outer slip rail portions 84-1, 84-2 are provided.

Those skilled in the art will appreciate that, alternatively, the second side subsystem 79 may include only one set of the second side straight rail portions and the outer subsystem 34 may include only one set of the outer slip rail portions (i.e., substantially at only one elevation), or more than two such sets.

As noted above, in one embodiment, the outer subsystem 34 and the second side subsystem 79 are operable by the drive subsystem 76B. As can be seen in FIGS. 1, 4, and 7, the adjustment elements 70' in the outer adjustable point devices 88 (i.e., in the outer subsystem 34) and the adjustment elements 61' in the adjustable point devices 59' (i.e., in the second side subsystem 79) preferably are driven by one or more drive elements 78B. From the foregoing, it can be seen that the adjustment elements 70' in the outer subsystem 34 and the adjustment elements 61' in the second side subsystem 79 are transversely movable relative to the conveyor 24, as indicated by arrows "$B_1$", "$B_2$" in FIG. 7. Those skilled in the art will appreciate that, in an alternative embodiment (not shown in FIGS. 1-9), the outer subsystem may include outer rail portions that are stationary relative to the conveyor.

Those skilled in the art will appreciate that rotation of the drive elements 78A causes corresponding movement of the adjustment elements 48, 70 transversely relative to the conveyor 24. As can be seen in FIG. 1, the transverse movement preferably is substantially orthogonal to the path "P". It will also be appreciated by those skilled in the art that the outer subsystem 34 may also be adjustable relative to the conveyor 24 (as shown in FIGS. 1, 4, and 7-9), or it may be fixed (not shown in FIGS. 1-9). As is known in the art, the rotation of the drive elements 78A, 78B may be initiated and controlled in any suitable manner, with any suitable means. For instance, the rotation of the drive element may be manually controlled by an operator (not shown) operating a handwheel (not shown in FIGS. 1-9). The handwheel may be functionally connected with a counting means to count rotations of the handwheel, thereby enabling the operator to rotate the handwheel by a preselected number of rotations thereof. This enables the operator to move rail portions by predetermined distances. With this arrangement, precise adjustment of the rail portions is achievable.

Those skilled in the art will appreciate that the first transition rail portion 44, the second transition rail portion 46, the first side straight rail portion 58, and the inner slip rail portions 62 are transversely movable relative to the conveyor 24 by one or more selected distances. As described above, such movement is accomplished by all the rail portions 44, 46, 58, and 62 because the adjustment elements 48, 70 to which such rail portions are connected are movable transversely relative to the conveyor 24 upon rotational movement of the drive elements 78A. As noted above, to adjust the positions of the rail portions, the rotation of the drive elements 78A is controlled so that the distance that the rail portions are transversely moved is a predetermined distance, i.e., as required for a particular container 22.

It will also be appreciated by those skilled in the art that the first transition rail portion 44, the second transition rail portion 46, the first side straight rail portion 58, and the inner slip rail portions 62 are substantially simultaneously movable relative to the conveyor 24 by the selected distance. From the foregoing, it can be seen that this is achievable because of the connection of the drive element 78A with the adjustable point devices that are connected (indirectly) to the rail portions.

In use, because the drive subsystem 76A causes movement of the adjustment elements 48, 70 in the inner subsystem 32 substantially in unison, the positions of the first side straight rail portion 58, the first and second transition rail portions 44, 46, and the inner slip rail portions 62 relative to the conveyor 24 can be rapidly, and accurately, changed to take into account any changes in the containers 22 that are to be moved on the conveyor 24. In addition, because the drive subsystem 76B causes movement of the adjustment elements 70 in the outer subsystem 34 substantially in unison, the positions of the second side straight rail portions 80 and the outer slip rail portions 84 relative to the conveyor 24 can also be rapidly, and accurately, changed to take into account any changes in the containers 22.

Those skilled in the art would appreciate that, although the first side subsystem 54 and the inner subsystem 32 include elements that are connected together (via the drive element 78A) so that they move in unison, and the second side subsystem 79 and the outer subsystem 34 also include elements that are connected together (via the drive element 78B) so that they also move in unison, the subsystems on the inner and outer sides of the conveyor 24 may be arranged so that they move simultaneously (i.e., with all elements, on both sides of the conveyor, moving the same distance at about the same time). Whether they are arranged to work together depends on the application for which the guide rail system 20 is designed.

As can be seen in FIGS. 1 and 2, the offset adjustable point device 40A is spaced apart from the boundary 30A by the preselected distance 42A. In contrast, in the outer subsystem, one of the outer adjustable point devices 88 is positioned substantially at the boundary 30A. (This adjustable point device is designated 88A for convenience.) The adjustment element 70 mounted therein is substantially aligned with the boundary 30A.

As can also be seen in FIG. 1, the contact surfaces of the rail portions preferably are substantially parallel to the path "P". In the invention herein, the contact surfaces are maintained substantially parallel to the path "P" as the rail portions (on which the contact surfaces are located) are moved transversely relative to the conveyor 24, so that the rail portions are moved smoothly and accurately when adjustments are made.

As noted above, the boundary 30 is located at a tangent point, i.e., it is positioned where the straight segments meet the curved segment. Where the curved segment of the conveyor is positioned between two straight segments thereof, there are two boundaries (i.e., tangent points) that are to be considered. For example, the two boundaries are identified for convenience in FIG. 1 as 30A and 30B. In the following description, it is assumed that the curved segment is positioned between two straight segments, so that there are two boundaries (i.e., tangent points).

As is well known in the art, in general, where the radius "R" is sufficiently large (as will be described), two of the inner adjustable point devices are positioned at the boundaries respectively (i.e., in addition to one or more inner adjustable point devices positioned adjacent to the curved segment and distal to the boundaries) (not shown). For these purposes, a "sufficiently large" radius "R" is a radius large enough that adjustable point devices located at the boundaries respectively (i.e., and substantially aligned, back-to-back) can function without physically interfering with each other, and/or without physically interfering with any other inner adjustable point devices. In the prior art, the positioning of two adjustable point devices at the boundaries respectively (i.e., as well as one or more adjustable point devices adjacent to the curved segment, between the boundaries) is conventionally believed to be necessary so that the inner slip rail portions are moved together, by substantially the same distance, and at substantially the same time.

However, a problem arises where the radius "R" of the path "P" along the curved segment is not sufficiently large to accommodate the adjustable point devices to which the inner rail portions are mounted. For the purposes hereof, the radius "R" at which the adjustable point devices cannot be positioned at the boundaries and therebetween without physically interfering with each other is referred to as the "critical radius". In this situation, if the inner adjustable point devices were located at the boundaries and otherwise therebetween, they would be too close to each other to permit operation thereof without physical interference with each other. This presents the problem of how to position the adjustable point devices that are included in the inner subsystem so that they do not interfere with each others' operation but also achieve smooth and substantially uniform, simultaneous movement of the inner rail portions.

Until the development of the invention herein, this was not thought to be possible, i.e., where the radius "R" is equal to or smaller than the critical radius. That is, it was considered not to be possible because, in the prior art, it was believed that adjustable point devices were required to be located at the boundaries in order to achieve smooth and accurate movement of the inner rail portions relative to the conveyor, when adjustment thereof is effected.

In the invention herein, smooth and substantially uniform movement of the inner rail portions is achieved, even though the radius "R" is equal to or less than the critical radius, because of the position of each of the offset adjustable point devices 40A, 40B relative to the boundaries 30A, 30B, and also because of the configuration of the transition posts 66A, 66B and the manner in which the first and second transition rail portions 44, 46 are attached thereto. It has been determined that, where the radius "R" is equal to or less than the critical radius, satisfactory movement of the inner slip rail portions relative to the conveyor is achievable where the inner subsystem 32 includes the offset adjustable point devices, i.e., the adjustable point devices 40A, 40B, each positioned at the preselected distance 42A, 42B from the boundary line 30A, 30B respectively. In addition, each of the offset adjustment elements 48 (mounted in the offset adjustable point devices) is attached to the transition posts 66, each of which is substantially larger than the inner post 72. As can be seen, for instance, in FIG. 1, because each of the adjustable point devices 40A, 40B is positioned at the preselected distance 42A, 42B from the boundaries 30A, 30B respectively (i.e., from the respective tangent points), the adjustable point devices 40A, 40B have sufficient clearance from each other that they can function without interfering with each other. Also, the central adjustable point device 68 has sufficient clearance relative to the offset adjustable point devices 40A, 40B that the central adjustable point device 68 can operate without physical interference therewith.

Preferably, the transition post 66A includes upper and lower caps 87A-1, 87A-2 that include respective cap contact surfaces 89A-1, 89A-2 for engaging the containers 22, to maintain the containers 22 in the preselected positions on the conveyor 24 (FIG. 5). As can be seen, for instance, in FIG. 5, the post 72 in the inner subsystem 32 does not include any contact surfaces thereon, and is not as wide as the transition post 66A. In effect, the transition post 66A supports a substantially rigid pair of caps 87A-1, 87A-2 with contact surfaces 89A-1, 89A-2 that are aligned with the first side rail contact surfaces 60A-1, 60A-2 respectively.

As noted above, the first transition rail portions 44A-1, 44A-2 are secured to the transition post 66A at its first end 75A-1, 75A-2. It will be understood that the first transition rail portions 44A-1, 44A-2 are also secured to the first side straight rail portions 58A-1, 58A-2 respectively (FIG. 5). The second transition rail portions 46A-1, 46A-2 are slidably connected to the transition post 66A at its second end 74A-1, 74A-2. It has been found that, with this arrangement, the first side straight rail portions, the first and second transition rail portions, and the inner slip rail portions 62, are movable substantially simultaneously, and in unison substantially parallel to the path "P", even though the radius "R" is less than the critical radius.

As can be seen in FIG. 5, in one embodiment, the second transition rail portions 46A-1, 46A-2 preferably are also slidably connected to the inner slip rail portions 62A-1, 62A-2. Similarly, second transition rail portions 46B-1, 46B-2 are slidably connected to the inner slip rail portions 62A-1, 62A-2.

In one embodiment, the inner subsystem 32 preferably also includes intermediate posts 90. For convenience, the intermediate posts illustrated in FIG. 5 are identified as 90A and 90B. As will be described, the intermediate posts provide support to the inner slip rail portions.

As can be seen in FIG. 5, the upper first transition rail portion 44A-1 preferably is secured to the transition post 66A by fasteners 92. Those skilled in the art will appreciate that two fasteners preferably are used, for sufficient strength. It will be understood that the lower first transition rail portion 44A-2 is also secured to the transition post 66A by fasteners (not shown). The upper and lower first transition rail portions 44A-1, 44A-2 are fixedly secured to the transition post 66A by the fasteners 92. Preferably, the upper and lower first transition rail portions 44A-1, 44A-2 are also fixedly secured to the upper and lower first side straight rail portions 58-1, 58-2 by any suitable means (not shown).

The upper second transition rail portion 46A-1 preferably is slidably connected to the transition post 66A and also to the intermediate post 90A by fasteners 93. Preferably, two fasteners 93 are used at each end of the first transition rail portion 46A-1, to provide sufficient structural strength. As can be seen in FIGS. 2 and 3, the fasteners 93 permit lateral movement (i.e., movement laterally relative to the direction of transverse movement) of the second transition rail portion 46A-1 relative to the transition post 66A, the inner slip rail portion 62A-1, and the intermediate post 90A as the second transition rail portion 46A-1 moves transversely. It will be understood that, in the same way, the lower second transition rail portion 46A-2 is slidably connected to the transition post 66A, the inner rail portion 62A-2, and the intermediate post 90A. As can be seen, for example, in FIGS. 1-3, the lateral movement which occurs during generally transverse movement of the slip rail portions is possible due to slots 94 in the slip rail portions, in which the fasteners are located, to guide the movement of the slip rail portions.

From the foregoing, it can be seen that the upper and lower first transition rail portions 44A-1, 44A-2 are fixedly secured to the transition post 66A at a first end 95 thereof (FIG. 5). Also, the upper and lower second transition rail portions 46A-1, 46A-2 are slidably secured to the transition post 66A at its second end 96. It is believed that, partly due to this arrangement (i.e., the upper and lower first transition rail portions 44A-1, 44A-2 fixedly secured to the first end 95 of the transition post 66A, and the upper and lower second transition rail portions 46A-1, 46A-2 slidably attached to the second end 96 of the transition post 66A), the inner subsystem 32 and the first side subsystem 54 function properly, permitting smooth transverse movement of the rail portions therein relative to the path. In effect, the transition post 66A links the inner subsystem and the first side subsystem. The offset location of the adjustment element 48A (i.e., spaced apart from the boundary 30A by the predetermined distance 42A) preferably is selected so that the second end 96 of the transition post 66A is positioned substantially at the boundary 30A. Because the transition post 66A is generally rigid, transverse movement of the adjustment element 48A causes corresponding movement of the transition post 66A, so that the second end 96 also moves correspondingly, causing transverse movement (i.e., and some lateral movement) of the upper and lower second transition rail portions 46A-1, 46A-2 slidingly attached thereto. In this way, although the adjustment element 48A is not aligned with the boundary 30A, the inner subsystem's rail portions, the first and second transition rail portions, and the first side subsystem's rail portions are movable transversely relative to the path "P" substantially in unison.

Those skilled in the art would appreciate that the preselected distances 42A, 42B (FIG. 2) do not necessarily have to be the same. As will be described, the preselected distances 42A, 42B may be different. It would also be appreciated by those skilled in the art that, where the distances 42A, 42B are not the same, the transition posts 66A, 66B associated therewith respectively are configured differently, to accommodate the difference between the distances 42A, 42B.

As can be seen in FIGS. 4 and 5, the inner slip rail portions 62A-1, 62A-2 are fixedly secured to the central post 72. The second transition rail portions 46B-1, 46B-2 are slidably connected to the inner rail portions 62A-1, 62A-2, to the intermediate post 90B, and to the transition post 66B in the same way as the first transition rail portions 46A-1, 46A-2. Also, it will be understood that the first transition rail portions 44B-1, 44B-2 are fixedly secured to first side straight rail portions (not shown in FIGS. 4 and 5).

As is known in the art, the slidable connections of the slip rail portions and the second transition rail portions permit the expansion and contraction of the part of an arc defined by the slip rail portions and the second transition rail portions. The expansion and contraction necessarily involves some lateral movement of the slip rail portions and the second transition rail portions relative to each other, i.e., movement that is lateral relative to the radial movement effected by the adjustment elements. The lateral movement of the rail portions relative to each other is permitted by fasteners located in slots of the rail portions for slidable engagement therewith.

It will be understood that, in FIG. 2, the adjustment elements 48A, 48B, and 70 are shown in the fully retracted positions, so that the first and second transition rail portions 44, 46 and the inner slip rail portions 62 are also shown in the fully retracted positions therefor in FIG. 2. Also, as noted above, in FIG. 6, the adjustment elements 48A, 48B, and 70 are shown in the fully extended positions.

As can be seen, for instance, in FIG. 5, the intermediate posts 90A, 90B are "floating" posts, in that they are not directly attached to adjustment elements. Fasteners 97 are secured to the intermediate posts 90A, 90B at the top and bottom ends thereof. However, the fasteners 97 slidably secure the upper and lower second transition rail portions and the upper and lower inner slip rail portions respectively to the intermediate posts so as to permit lateral movement of the rail portions relative to each other, and relative to the intermediate posts 90, as the rail portions are moved transversely relative to the conveyor. For instance, as shown in FIG. 5, the upper and lower second transition rail portions 46A-1, 46A-2 are slidably secured to the upper and lower slip rail portions 62A-1, 62A-2 respectively. Also, such rail portions are slidably secured to the intermediate post 90A. In this way, the intermediate posts support the rail portions in the areas between the offset adjustable point devices 40A, 40B and the central adjustable point device 68 while permitting the rail portions sufficient freedom of movement to provide smooth, substantially uniform transverse movement of the rail portions relative to the conveyor 24.

From the foregoing, it can be seen that each of the inner slip rail portions 62, the first transition rail portions 44, the second transition rail portions 46, and the first side straight rail portion 58 is movable transversely relative to the conveyor 24 by one or more selected distances. Preferably, such movement is initiated and controlled by the inner drive subsystem 76A, i.e., the selected distance of transverse movement is controlled by an operator (not shown) of the inner drive subsystem. Furthermore, it can also be seen that the inner slip rail portions 62, the first transition rail portions 44, the second transition rail portions 46, and one or more first side straight rail portions 58 are substantially simultaneously movable. As described above, movement of the rail portions in unison preferably is effected via the drive subsystem 76A.

As an example, a moved part of a first side straight rail portion (identified for clarity of illustration as 58' in FIG. 2) is shown in FIG. 2, in dashed lines. As can be seen in FIG. 2, the first side straight rail portion 58' is displaced transversely (and inwardly) relative to another position thereof shown by the rail portion 58 by a selected distance "SD". From the foregoing, those skilled in the art would appreciate that the first transition rail portions 44 and the second transition rail portions 46 included in the inner subsystem 32 are moved in unison (i.e., by the selected distance SD) with the first side straight rail portion 58.

In one embodiment, the inner adjustment element 70, the offset adjustment elements 48, and the first side adjustment elements 61 are movable substantially in unison with each other relative to the conveyor 24 to position the inner slip rail portions 62, the first and second inner transition rail portions 44, 46, and the first side straight rail portion(s) 58 respectively for engaging the inner contact surfaces 64, the first transition rail contact surface 50 and the second transition rail contact surfaces 52, and the first side straight rail contact surface 60 respectively with the containers, to maintain the containers in the preselected positions on the conveyor 24. The movement in unison (i.e., the same selected distance, transverse to the path "P", at substantially the same time) preferably is effected using the drive subsystem 76A, as described above.

As noted above, in some embodiments, the outer subsystem may include one or more rail portions that are fixed in position relative to the conveyor (not shown in FIGS. 1-9). However, in the guide rail system 20 illustrated in FIGS. 1-9, the outer subsystem 34 preferably includes one or more movable rail portions. In one embodiment, the outer subsystem 34 preferably includes the second side straight rail portion(s) 80 having the second side contact surface(s) 82 for engaging the containers, and the outer slip rail portion(s) 84 having the outer slip rail contact surface(s) 86 and positioned to engage the outer slip rail contact surface(s) 86 with the containers as the containers are moved therepast by the conveyor 24, to maintain the containers in the preselected positions thereon. Preferably, the movement of the outer rail portions is in unison, and initiated and controlled by the outer drive subsystem 76B. It will be understood that the outer drive subsystem 76B is the same as the inner drive subsystem 76A in all material respects.

An alternative embodiment of the guide rail system 120 of the invention is illustrated in FIGS. 10A-12C. As can be seen, for instance, in FIGS. 10A, 11A, and 12A, the guide rail system 120 preferably additionally includes one or more support devices 102 for supporting a rail portion 145 selected from the group consisting of one or more of the inner slip rail portions 162, one or more of the second transition rail portions 146, and combinations thereof. The support devices 102 provide additional support to the inner rail portions as they are moved relative to the conveyor. It has been found that the support devices 102 are preferred where the curved segment defines a 180° curve (FIG. 10A), i.e., rather than a 90° curve (FIG. 1). Where the curved segment defines a curve of approximately 180°, the parts of the rail portions located between the adjustable point devices tend to become somewhat loosely connected to the balance of the structure over time.

Only one embodiment of the support device 102 is illustrated in FIGS. 10A-12C. As can be seen in FIGS. 10A-12C, the support devices 102 preferably are positioned to support the inner slip rail portions 162 and/or the second transition rail portions 146 as they are moved transversely relative to the path "P$_1$" (FIG. 12A). However, those skilled in the art would appreciate that various arrangements are possible, depending on the layout and requirements of a particular guide rail system.

Figure 10A:
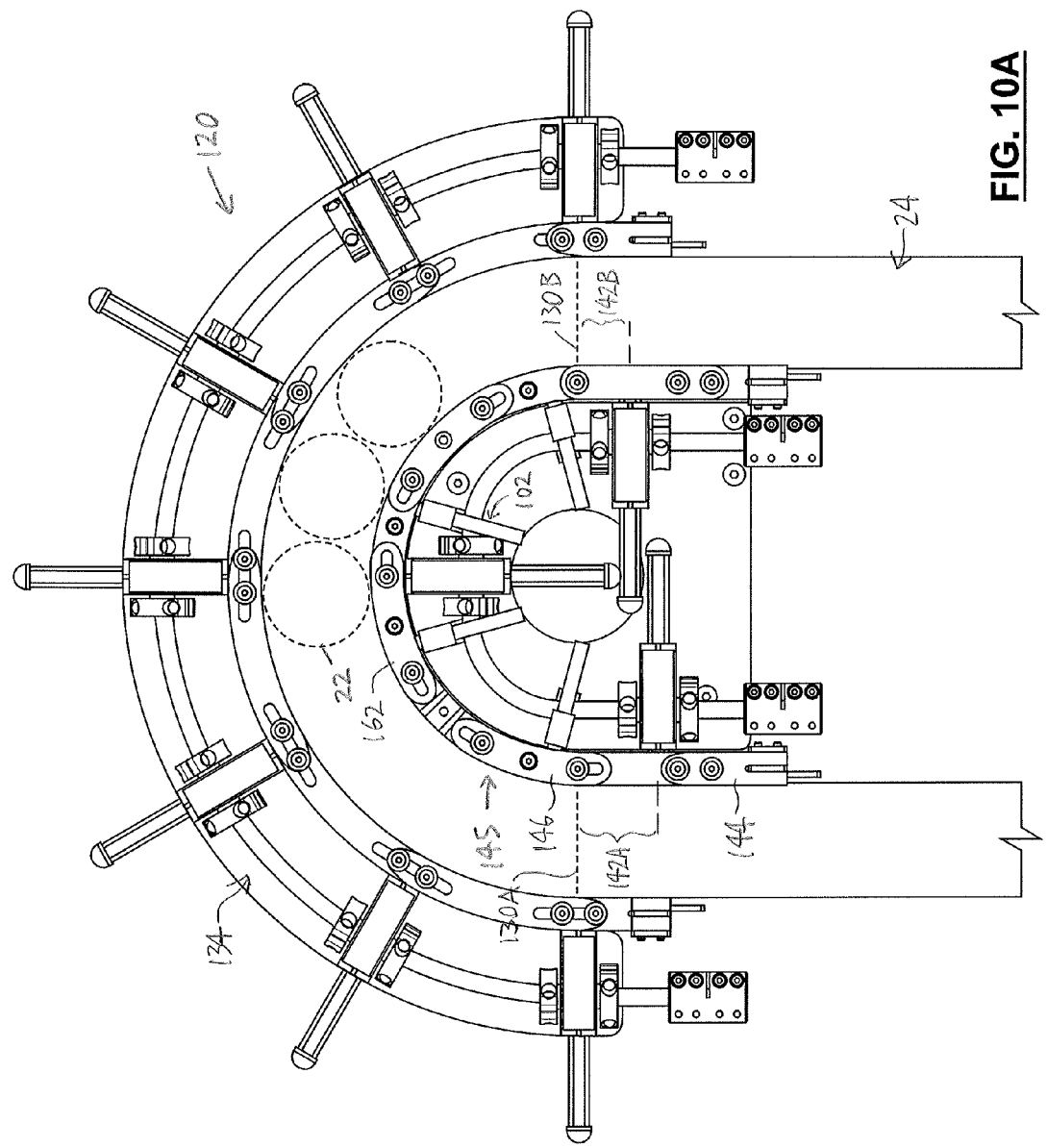
FIG. 10A is a top view of an alternative embodiment of the guard rail system of the invention in which adjustment elements thereof are shown fully retracted, drawn at a smaller scale.
Figure 10B:
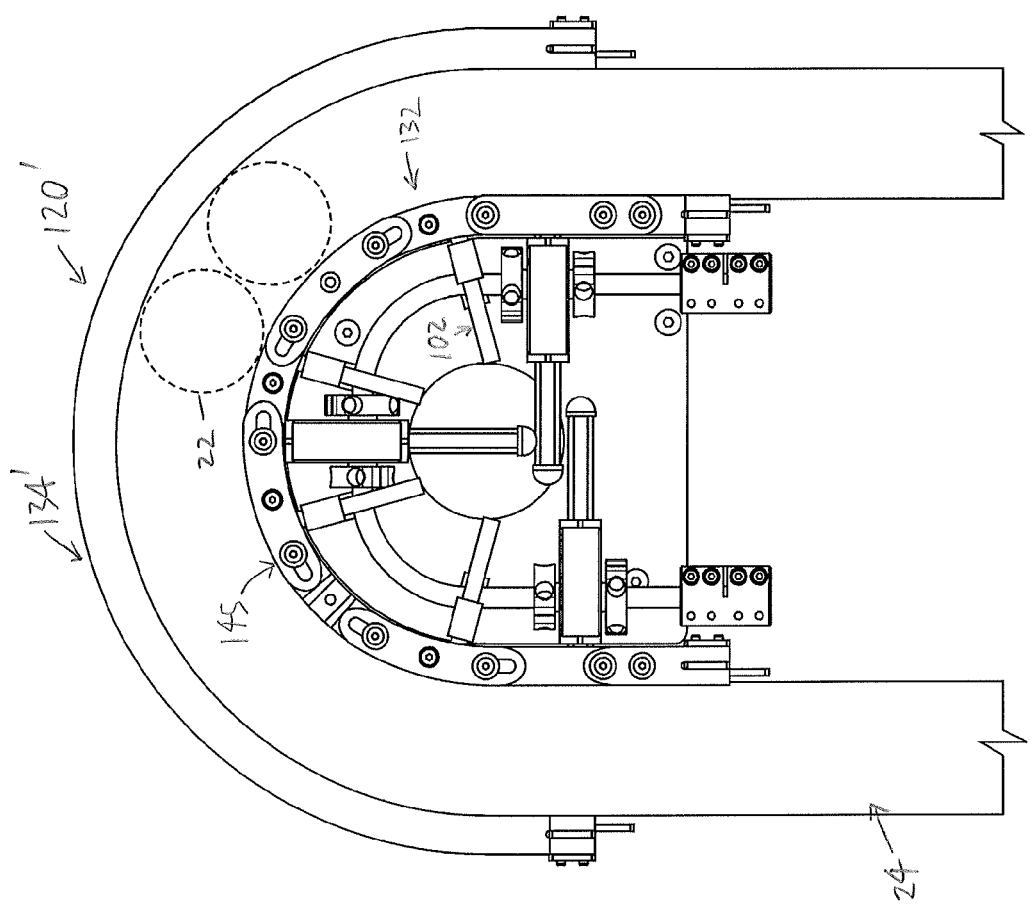
FIG. 10B is a top view of another alternative embodiment of the guard rail system of the invention.
Figure 10C:
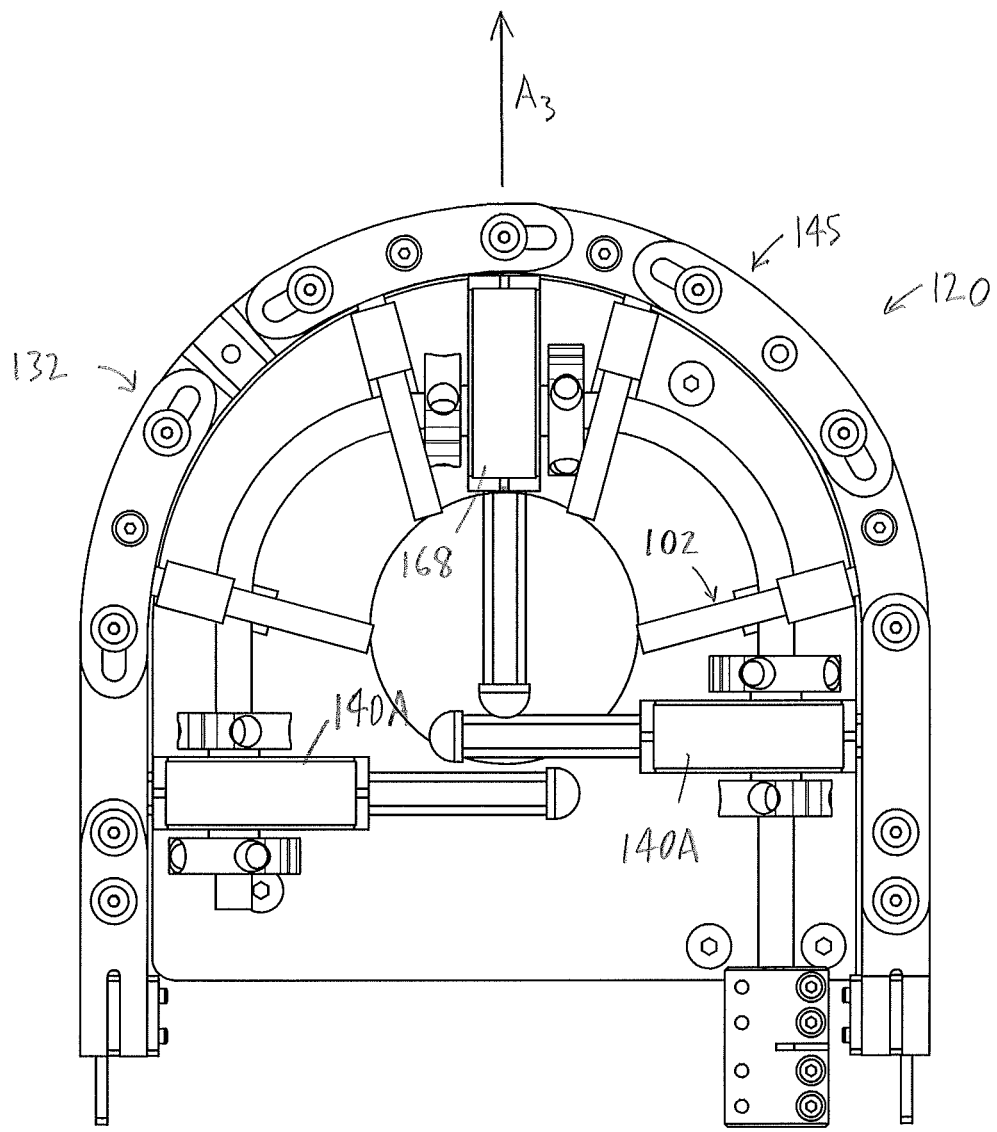
FIG. 10C is a top view of an embodiment of an inner subsystem of the guide rail system of FIG. 10A, in which the adjustment elements are shown fully retracted, drawn at a larger scale.
Figure 11A:
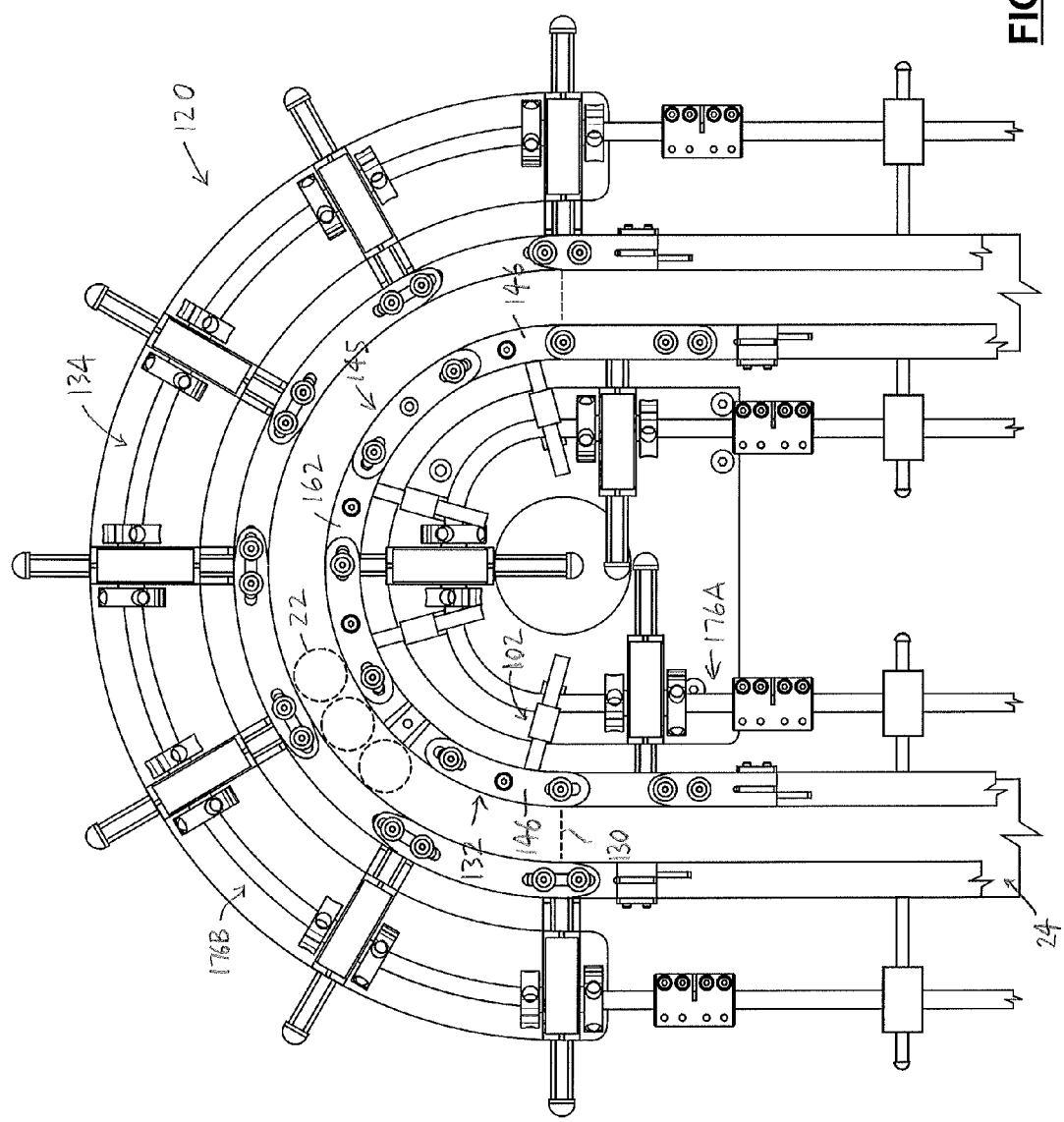
FIG. 11A is a top view of the guide rail system of FIG. 10A in which the adjustment elements are shown partially extended, drawn at a smaller scale.
Figure 11B:
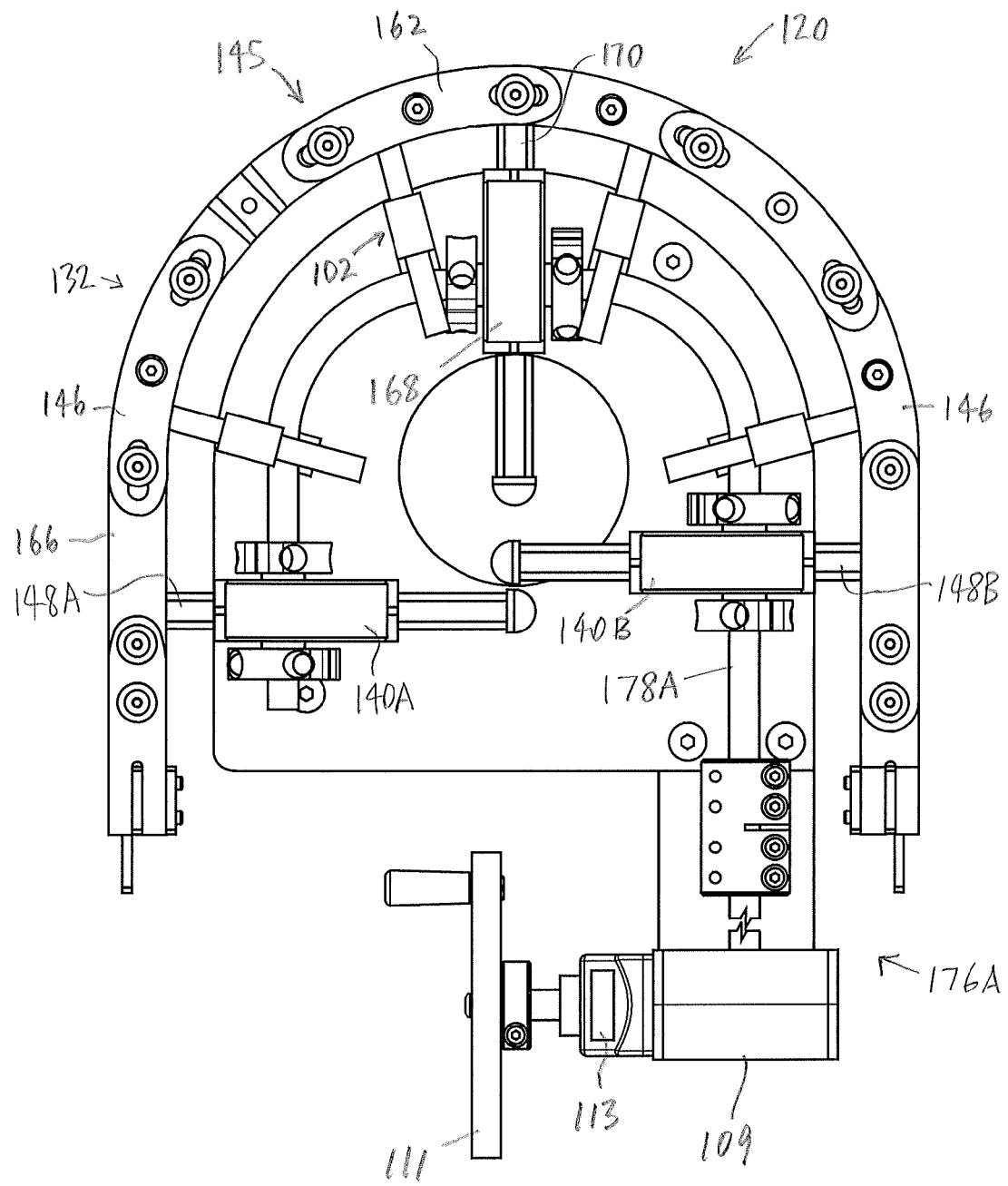
FIG. 11B is a top view of the inner subsystem of the guide rail system of FIG. 11A, drawn at a larger scale.

In FIGS. 10A-10C, the adjustment elements 148A, 148B, and 170 are shown fully retracted. In FIGS. 11A-11C, the adjustment elements 148A, 148B, and 170 are shown partially extended, and in FIGS. 12A-12C, the adjustment elements 148A, 148B, and 170 are shown fully extended.

Figure 12A:
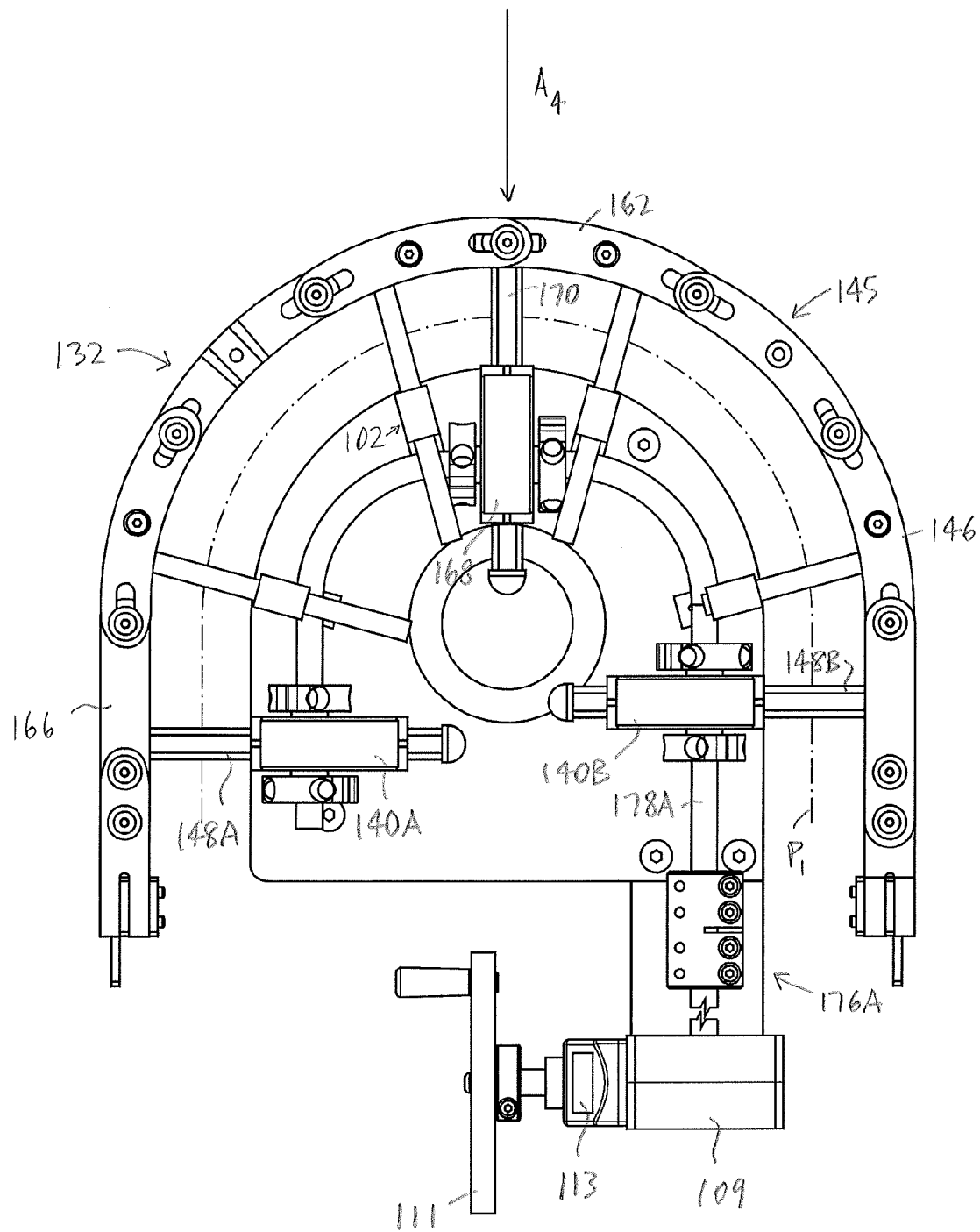
FIG. 12A is a top view of the inner subsystem of the guide rail system of FIGS. 10A and 11A in which the adjustment elements are shown fully extended.
Figure 12B:
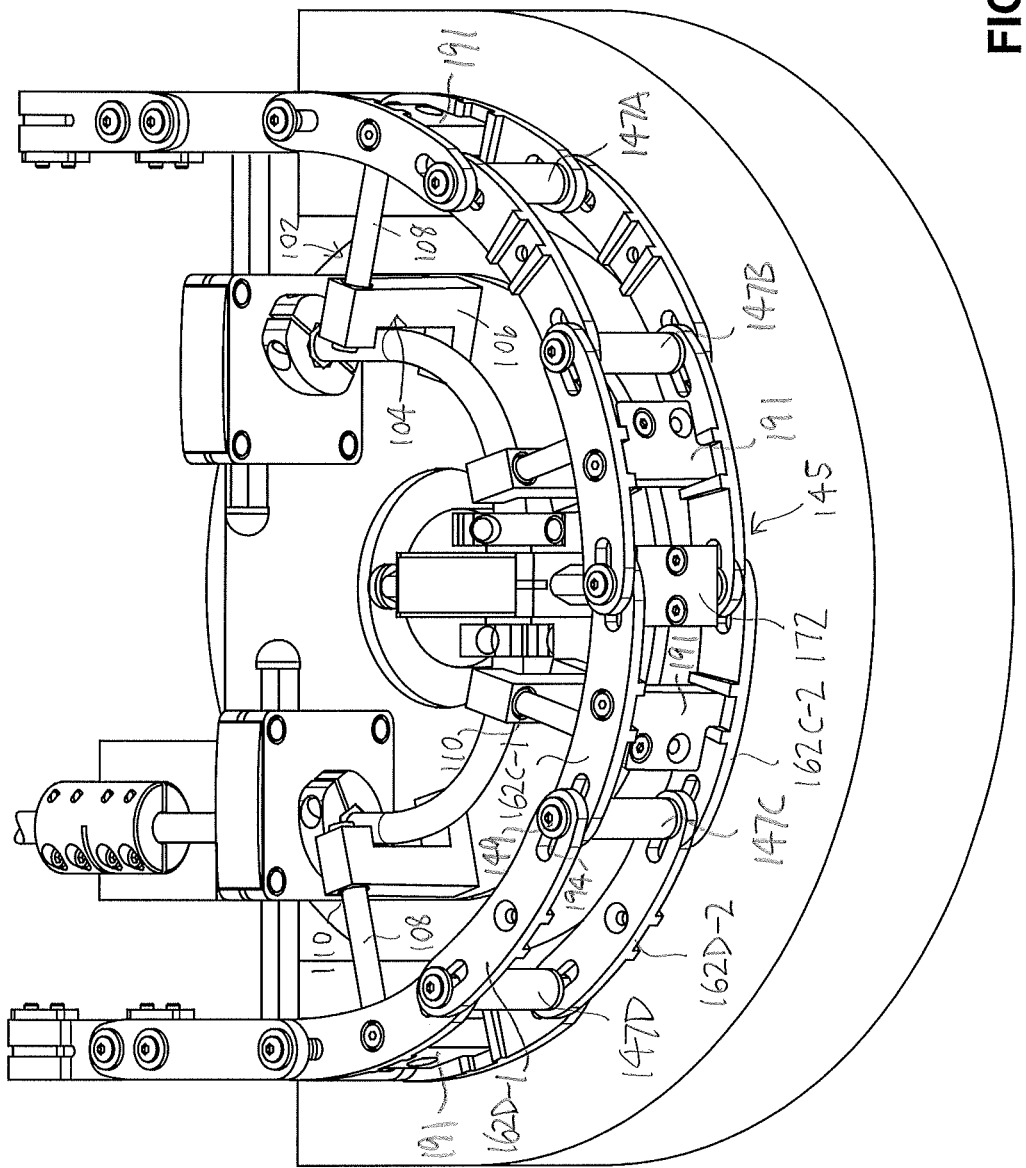
FIG. 12B is an isometric view of the inner subsystem of FIG. 12A.

In FIGS. 10B, 11B, and 12B, the guide rail system 120 includes an outer subsystem 134 that includes rail portions that are fixed relative to the conveyor 24, rather than movable. The views of the alternative embodiment provided in FIGS. 10B, 11B, and 12B are for illustrative purposes. Those skilled in the art would appreciate that, in some guide rail systems, it is not necessary to provide an outer subsystem in which the rail portions are movable.

Figure 12C:
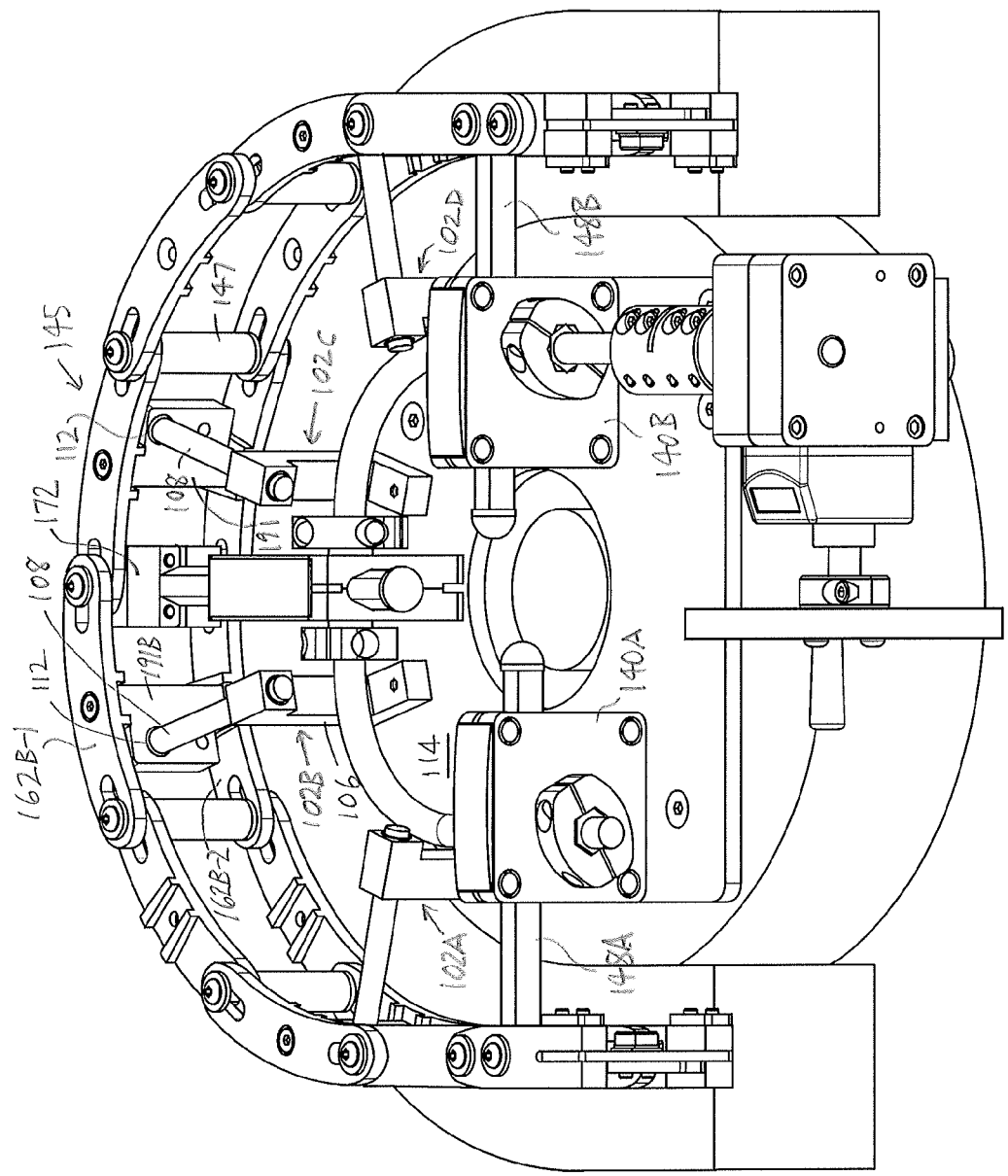
FIG. 12C is another isometric view of the inner subsystem of FIG. 12A.

Those skilled in the art would appreciate that the support device may have different embodiments. As can be seen in FIGS. 12A-12C, in one embodiment, the support device 102 preferably includes a cantilever element 104. Preferably, the cantilever element 104 has a base portion 106 and a movable portion 108 extending between first and second ends 110, 112 thereof (FIGS. 12B, 12C). The movable portion 108 preferably is movable relative to the base portion 106 between an extended position (FIGS. 12A-12C), in which the second end 112 is positioned distal to the base portion 106, and a retracted position (FIGS. 10A-10C), in which the second end 112 is positioned proximal to the base portion 106. Preferably, the base portion 106 is secured to a foundation element 114, and the second end 112 of the movable portion 108 is connected to the rail portion 145, so that the cantilever element 104 supports the rail portions(s) 145. It will be understood that, in the embodiments illustrated in FIGS. 10A-12C, the second end 112 of the movable portion 108 is indirectly connected to the rail portion 145, but other arrangements are possible, e.g., in which the second end 112 is directly attached to the rail portion 145. Such an arrangement may, for example, be used with single-level rail portions (i.e., rather than the two-level rail portions illustrated) (not shown).

In one embodiment, the guide rail system 120 additionally includes one or more midway intermediate posts 191 engaged with the rail portion 145 and positioned between the inner post 172 and the transition posts 166A, 166B, for supporting the rail portion 145. Preferably, the second end 112 of the movable portion 108 is attached to the midway intermediate post 191, for supporting the midway intermediate post and the rail portion 145.

Those skilled in the art would appreciate that the movable portion 108 may be engaged with the rail portions, to provide support thereto, in a variety of arrangements. In one embodiment, and as can be seen in FIGS. 12B and 12C, the second end 112 of the movable portion 108 preferably is secured to the midway intermediate post 191. As will be described, the rail portions 145 are also attached to the midway intermediate post 191, and in this way, the movable portion 108 is connected (i.e., indirectly connected) to the rail portion(s) 145 to which the midway intermediate post 191 is attached.

For convenience, the support devices are identified in FIG. 12C as support devices 102A-102D. As shown in FIGS. 12B and 12C, the support device 102B is positioned beside a central adjustable point device 168. The second end 112B is secured to a midway intermediate post 191B, which is positioned beside the central post 172 (FIG. 12B). In turn, the post 191B is secured, at its upper end, to an upper inner slip rail portion 162B-1, and at its lower end, to a lower inner slip rail portion 162B-2 (FIGS. 12B, 12C). As described above, the upper and lower slip rail portions 162B-1, 162B-2 are included in the rail portion 145. From the foregoing, it can be seen that the support device 102B is directly attached to (and supports directly) the midway intermediate post 191B, and due to this direct attachment, the support device 102B indirectly supports the inner slip rail portions 162B-1, 162B-2 to which it is indirectly connected (i.e., via the midway intermediate post 191B). Those skilled in the art would appreciate that the support provided by the support device 102B to the midway intermediate post 191B and, indirectly, to the rail portion 145 (i.e., the upper and lower slip rail portions 162B-1, 162B-2) is provided both while the inner slip rail portions 162B-1, 162B-2 are moved substantially transversely relative to the conveyor 24, as well as when they are stationary.

It will be understood that the manner in which the other support devices 102A, 102C and 102D are connected to the rail portions 145 respectively is the same as the (indirect) connection of the support device 102B to the inner slip rail portions 162B-1, 162B-2 in all material respects. Accordingly, further description in this regard is not needed.

As can be seen in FIGS. 12B and 12C, the guide rail system 120 preferably also includes a number of end posts 147. For convenience, the end posts are identified in FIG. 12B as 147A-147D. It can be seen in FIGS. 12B and 12C that the end posts 147 preferably are positioned at the overlapping ends of selected slip rail portions 162, to provide support thereto, and also to slidably connect the overlapping slip rail portions 162, to permit lateral movement thereof relative to each other as they are moved transversely relative to the conveyor. The end posts 147 are "floating", as they are not attached directly to adjustment elements.

Referring to the end post 147C as an example, it can be seen in FIG. 12B that a fastener 149 is secured to the end post 147 at its top end. It will be understood that another fastener (not shown) is secured to the end post 147C at its bottom end. The upper slip rail portions 162C-1 and 162D-1 overlap at the top end of the end post 147C, and the lower slip rail portions 162C-2 and 162D-2 also overlap at the bottom end thereof. It will be understood that the fasteners at the top and bottom ends of the end post 147C permit sliding movement of the slip rail portions 162C-1 and 162D-1 relative to each other, and also of the slip rail portions 162C-2, 162D-2 respectively. The fastener 149 extends through slot 194. The slots 194 in the slip rail portions permit sliding movement of the slip rail portions relative to each other while they are held together by the fastener 149, in a manner that is known in the art. As the other end posts are connected to the slip rail portions in the same way (i.e., with no material differences), further description regarding the other end posts is not needed.

From the foregoing description and FIGS. 10A-12C, it can be seen that the movable portion 108 is moved by the intermediate post 191 to which the movable portion 108 is attached, so that the movable portion 108 follows the movement of the rail portion 145 to which it is connected, i.e., indirectly connected. For instance, when the adjustment elements are moved toward the fully extended positions, the rail portions are moved outwardly (i.e., in the direction indicated by arrow "$A_3$" in FIG. 10C), and due to their indirect connections to the rail portions, the movable portions 108 are also moved accordingly, to provide support to the midway intermediate posts, and ultimately to the rail portions. Similarly, when the rail portions are moved inwardly (i.e., in the direction indicated by arrow "$A_4$" in FIG. 12A), the movable portions 108 are also moved accordingly, to provide support to the rail portions.

In FIG. 11B, a gearbox 109 is shown connected to the drive element 178A. In one embodiment, the drive subsystem 176A preferably includes the gearbox 109 and a handwheel 111 for controlling rotation of the drive element 178A via the gearbox 109. The gearbox 109 is shown as including a counter 113, for counting rotations of the handwheel 111, thereby enabling the operator (not shown) to rotate the drive element 178A a predetermined number of rotations, thereby causing the adjustment elements to move a predetermined distance. As noted above, this mechanism conveniently provides for precise control of the movement of the adjustment elements in unison. (It will be understood that the location of the gearbox and the handwheel in FIG. 11B is for clarity of illustration, as in practice these elements preferably are positioned in a location convenient for the operator.)

Figure 16A:
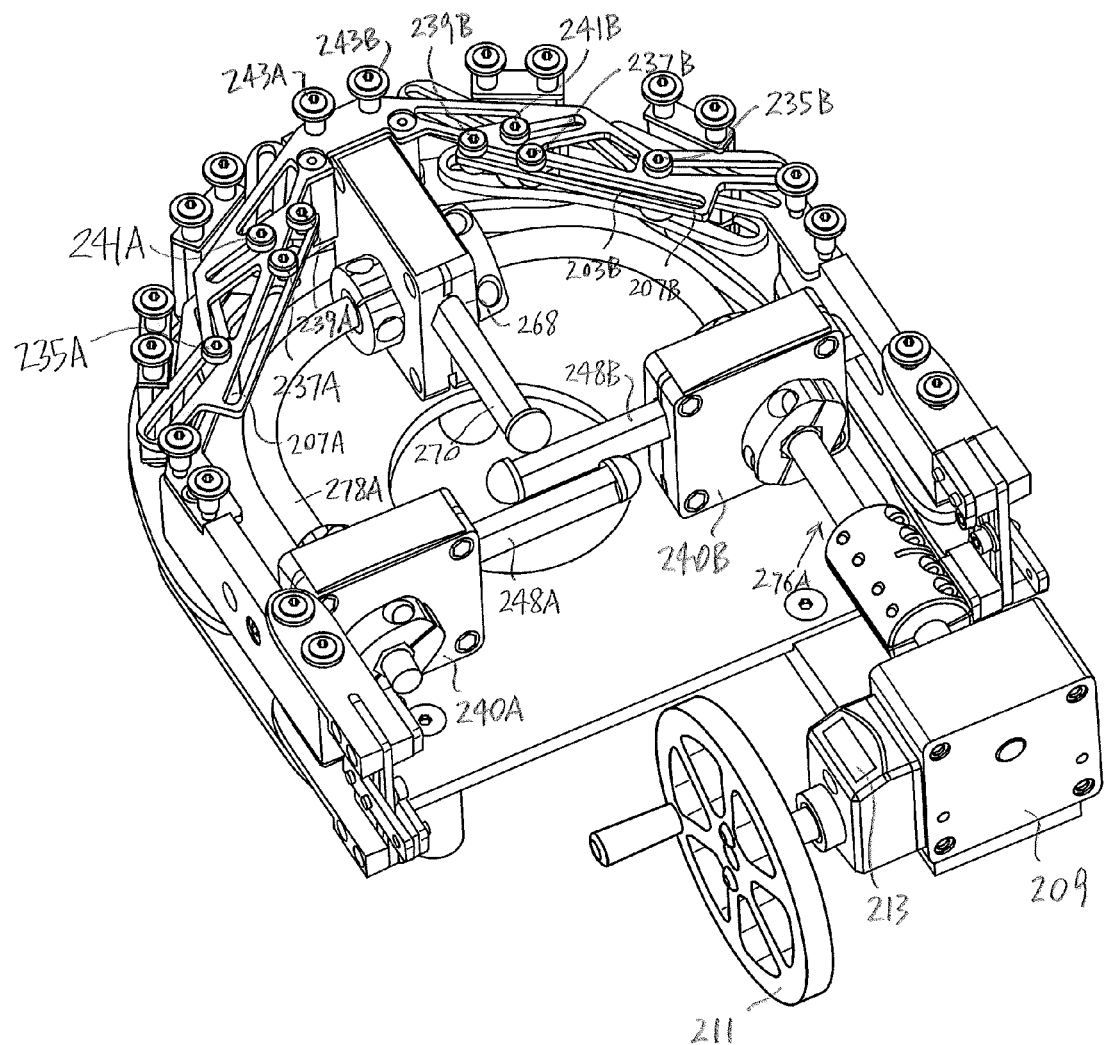
FIG. 16A is an isometric view of the inner subsystem of the guide rail system of FIG. 13A, with certain elements thereof omitted.
Figure 16B:
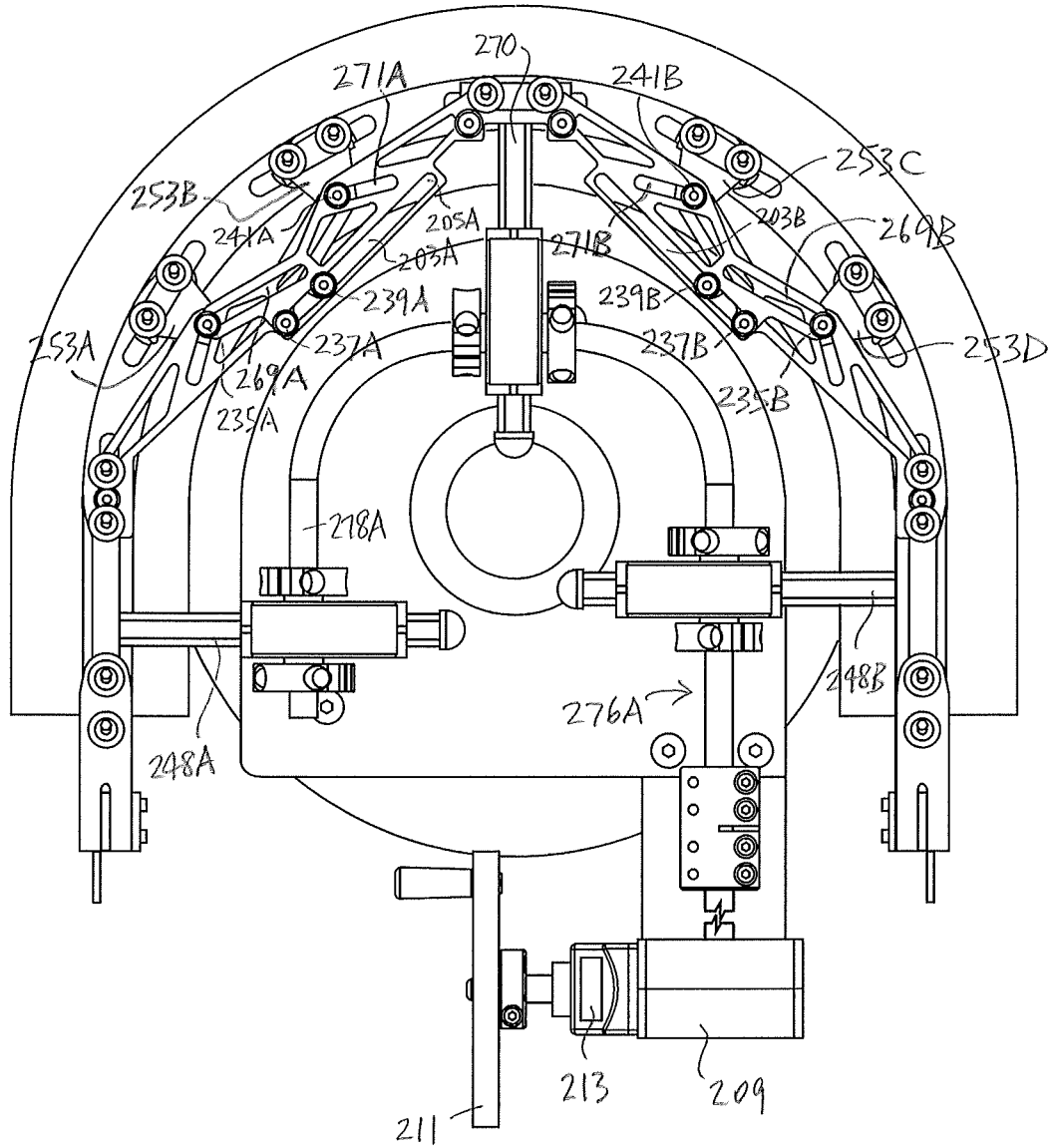
FIG. 16B is a top view of the inner subsystem of the guide rail system of FIG. 12, with certain elements thereof omitted.
Figure 17:
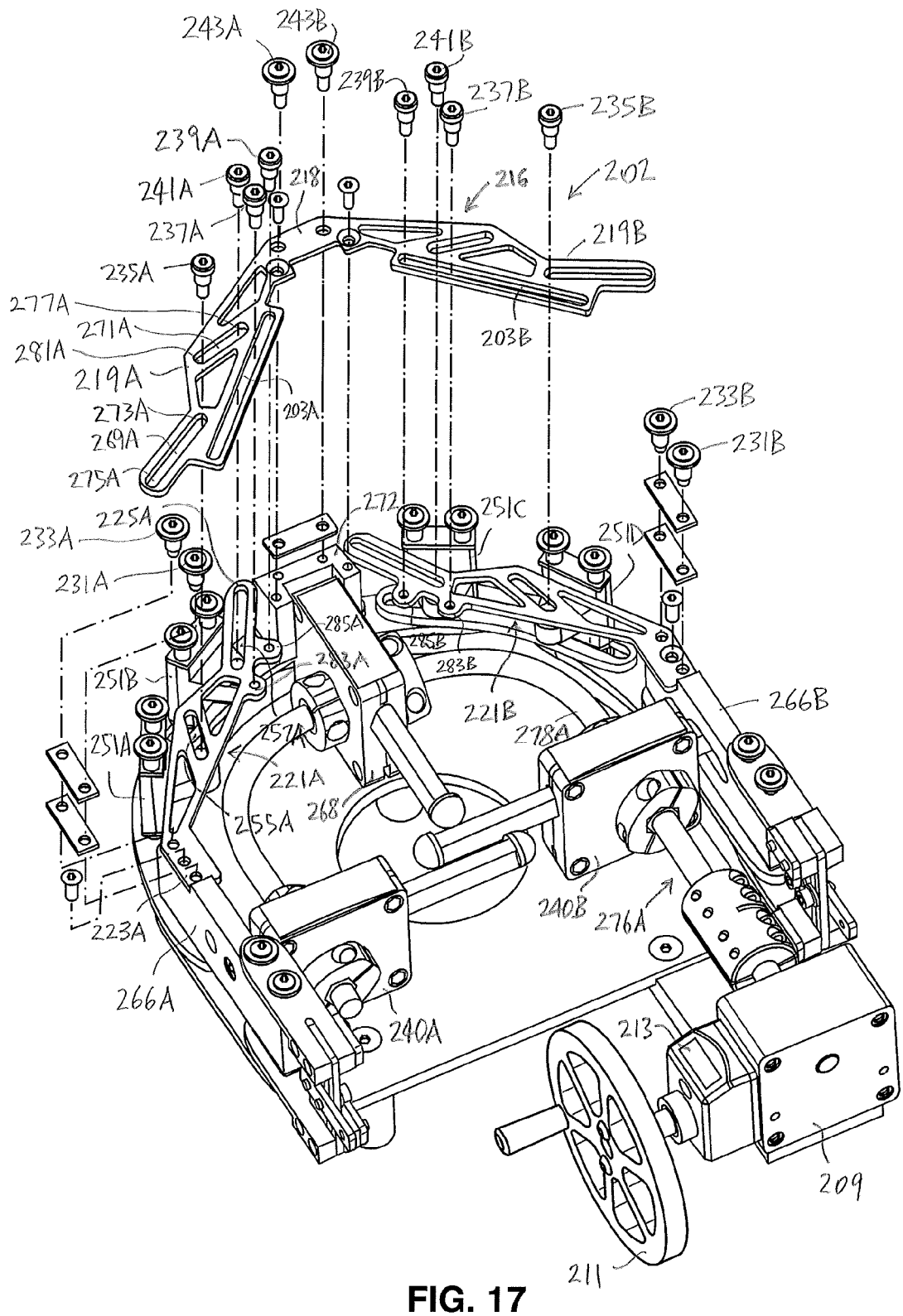
FIG. 17 is an exploded view of the inner subsystem of the guide rail system of FIG. 15A.

Another embodiment of the guide rail system 220 of the invention is illustrated in FIGS. 13A-17. In the guide rail system 220, a support device 202 preferably includes a first bracket 216 having a central portion 218 thereof secured to a central post 272, and one or more arms 219 extending from the central portion (FIG. 17). It is also preferred that the support device 202 includes one or more second brackets 221 extending between first and second ends 223, 225 thereof. Preferably, the first end 223 is secured to a transition post 266. In one embodiment, it is also preferred that the second end 225 of the second bracket 221 is slidably secured to the arm 219 of the first bracket, to support the rail portion 245, as will be described.

As can be seen in FIG. 17, in one embodiment, the guide rail system 220 preferably includes the two transition posts 266A, 266B, and two second brackets 221A, 221B, as identified in FIG. 17 for convenience. Each of the second brackets 221A, 221B is positioned to support the rail portions 245 located between the central post 272 and one of the transition posts 266A, 266B. (It will be understood that the rail portion 245 is selected from the group consisting of one or more inner slip rail portions 262, one or more second transition rail portions 246, and combinations thereof.) The first bracket 216 preferably includes two arms identified as 219A, 219B in FIG. 17 for convenience. As will be described, the arms 219A, 219B are formed to cooperate with the second brackets 221A, 221B for supporting the rail portions 245.

Figure 13A:
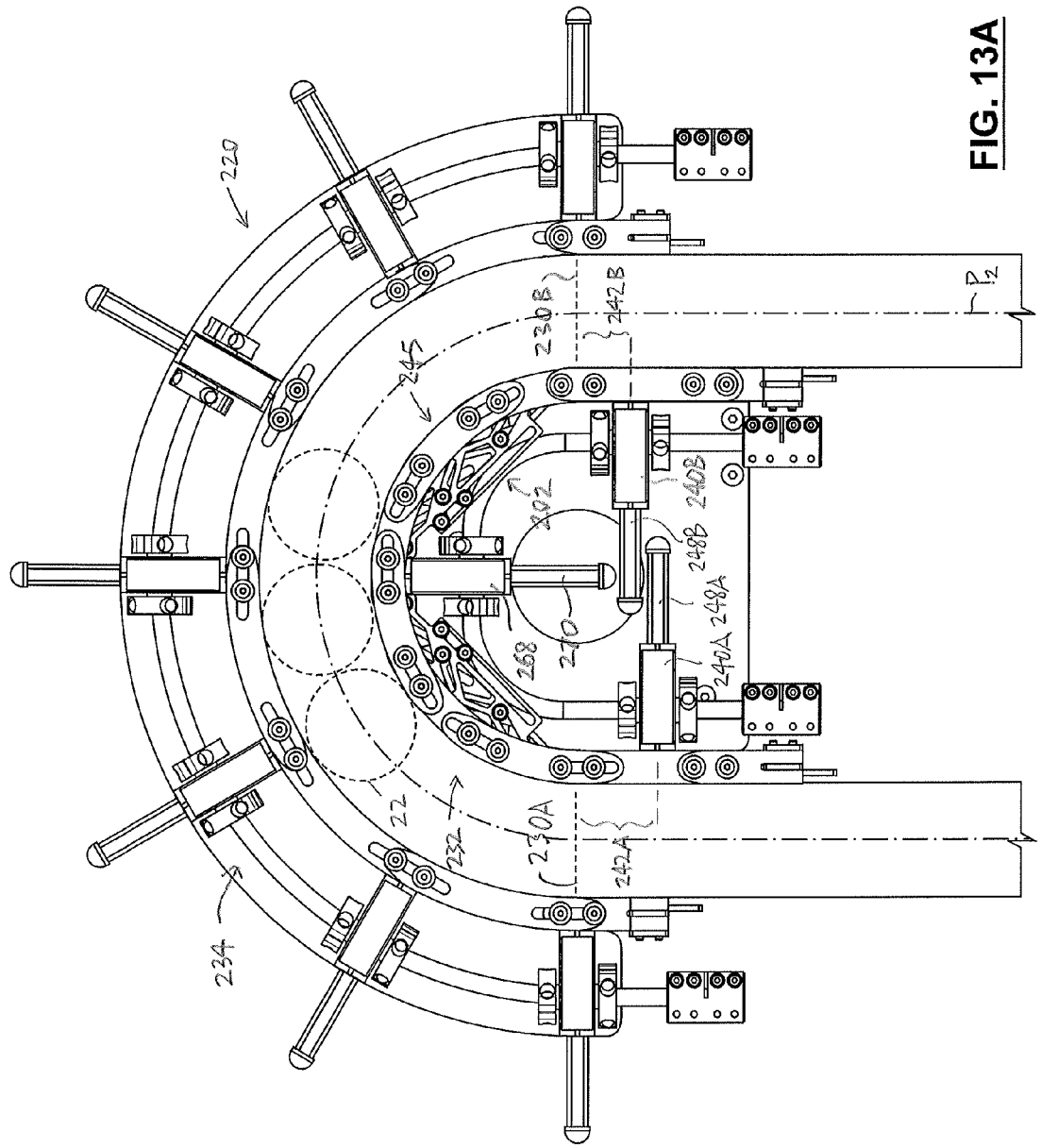
FIG. 13A is a top view of another embodiment of the guide rail system of the invention in which adjustment elements are shown fully retracted, drawn at a smaller scale.
Figure 13B:
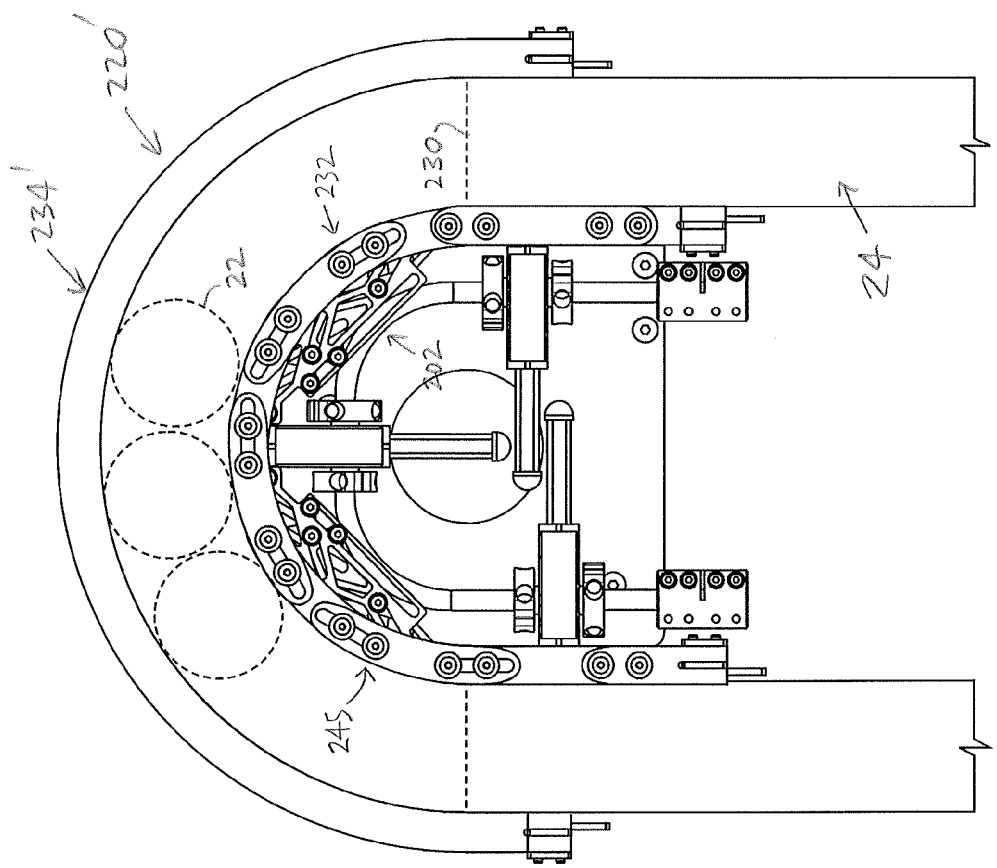
FIG. 13B is a top view of another alternative embodiment of the guide rail system of the invention.
Figure 13C:
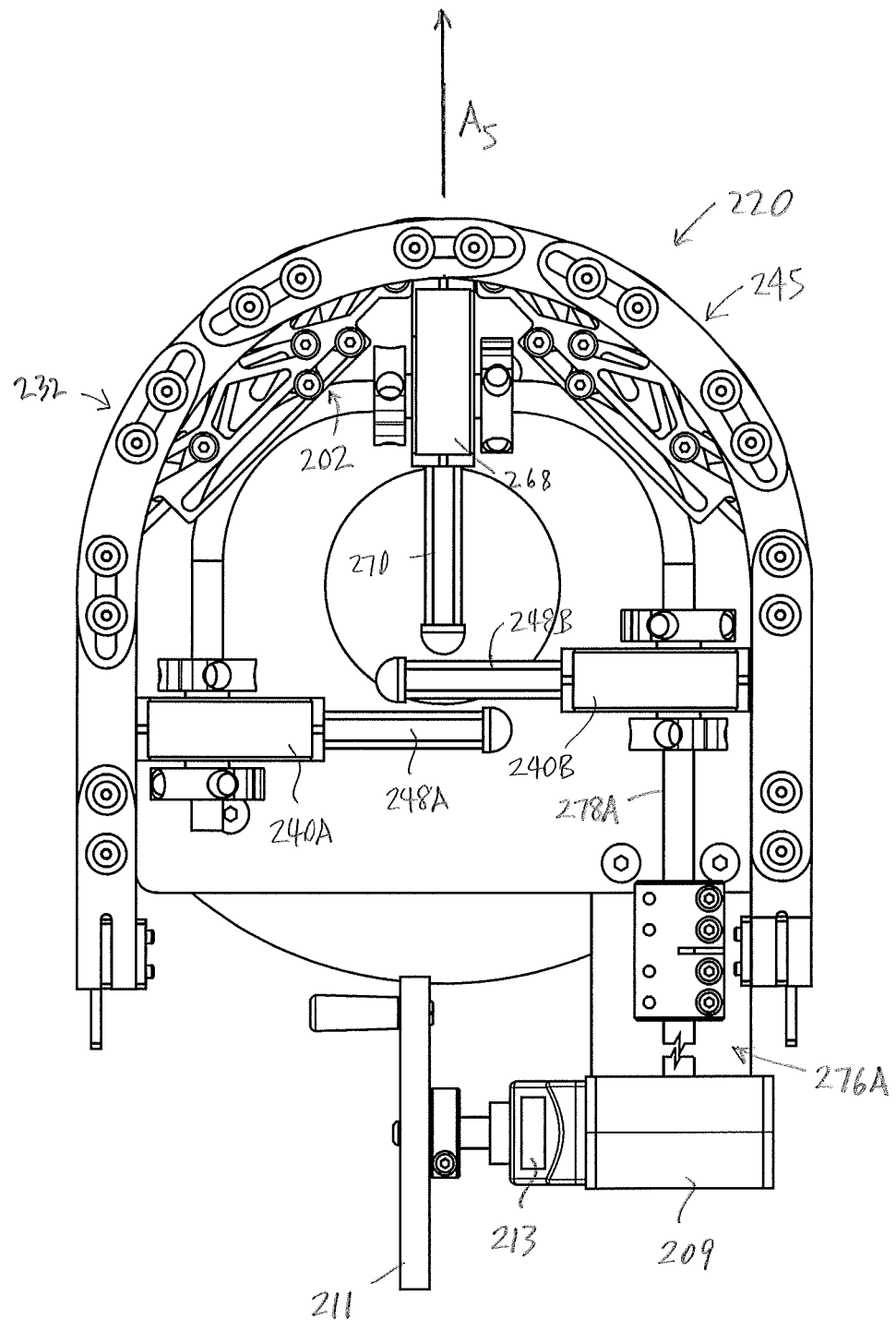
FIG. 13C is a top view of an inner subsystem of the guide rail system of FIG. 13A, drawn at a larger scale.
Figure 14A:
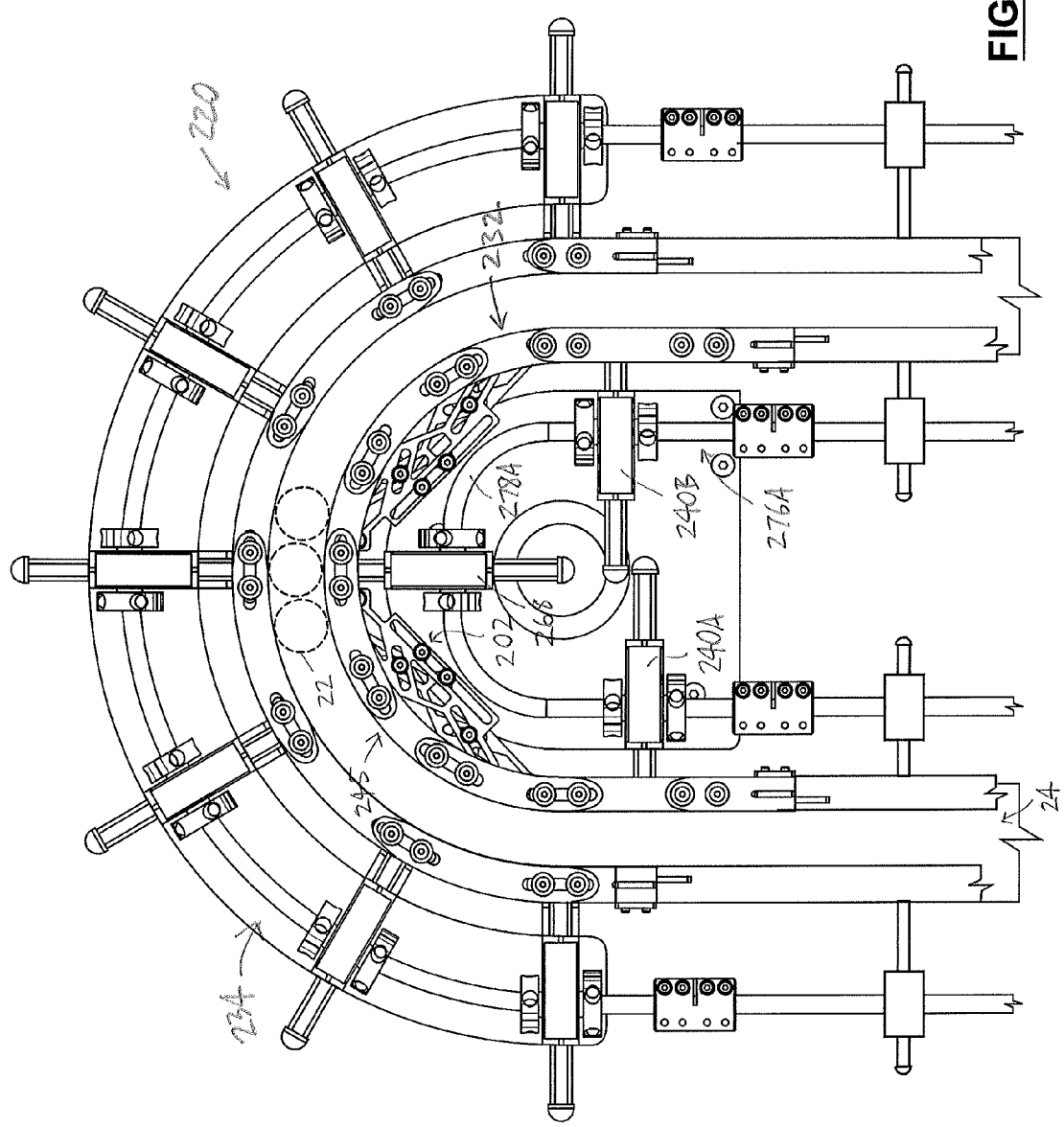
FIG. 14A is a top view of the guide rail system of FIG. 13A in which the adjustment elements are shown partially extended, drawn at a smaller scale.
Figure 14B:
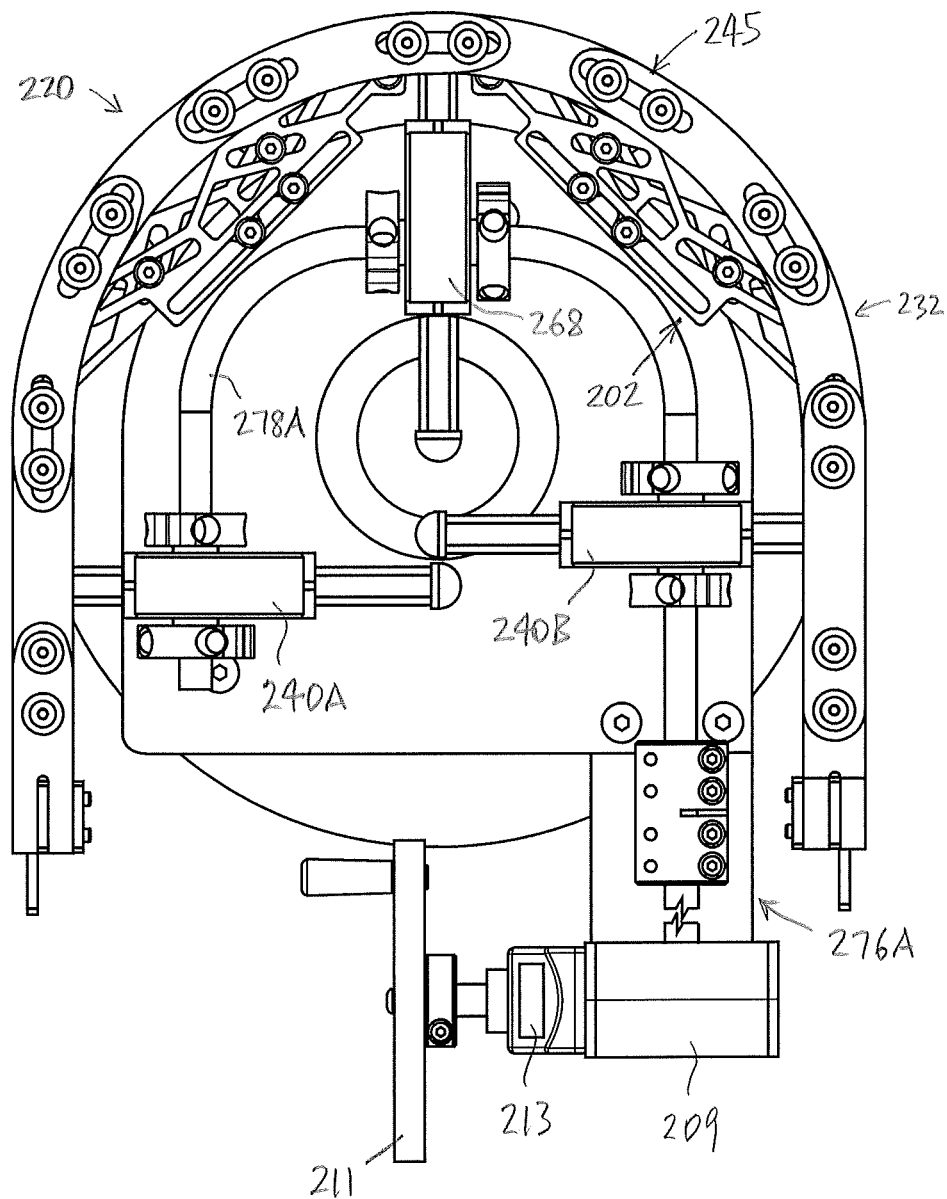
FIG. 14B is a top view of an inner subsystem of the guide rail system of FIG. 14A, drawn at a larger scale.

In FIGS. 13A-13C, adjustment elements 248A, 248B, and 270 are shown fully retracted. In FIGS. 14A and 14B, the adjustment elements 248A, 248B, and 270 are shown partially extended, and in FIGS. 15A-15C, the adjustment elements 248A, 248B, and 270 are shown fully extended.

As will be described, when the adjustment elements are moved outwardly (i.e., in the direction indicated by arrow "$A_5$" in FIG. 13C), the support device 202 moves with the rail portions 245, and the posts supporting the rail portions 245. When the adjustment elements are moved inwardly (i.e., in the direction indicated by arrow "$A_6$" in FIG. 15A), the support device 202 moves with the rail portions 245, and the posts supporting the rail portions 245. Also, it will be understood that the guide rail system 220 is configured to guide the containers 22 along a path "$P_2$" (FIG. 13A).

Figure 15A:
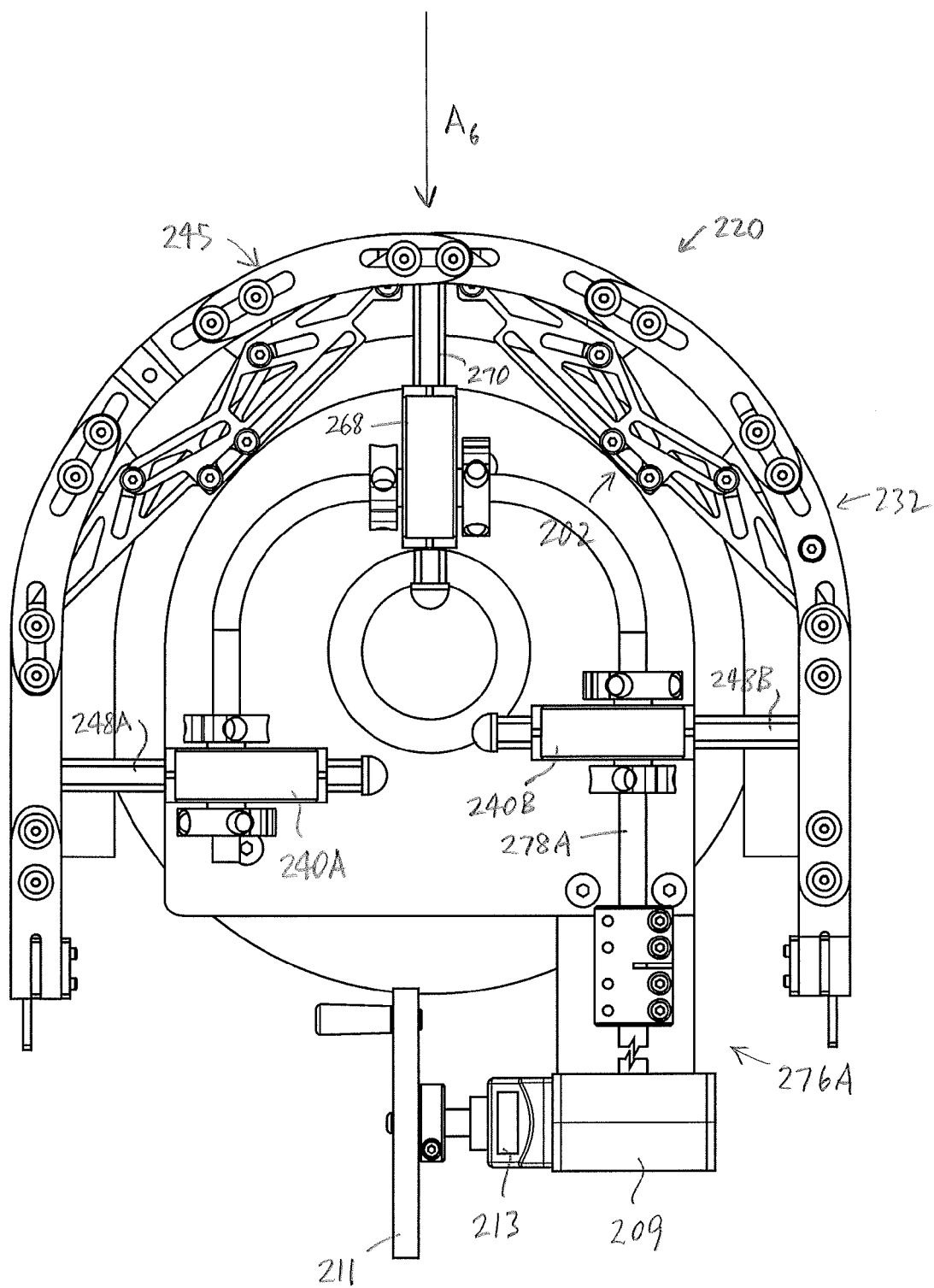
FIG. 15A is a top view of the inner subsystem of the guide rail system of FIG. 14A in which the adjustment elements are shown fully extended.

As can be seen in FIGS. 13A, 14A, and 15A, the preselected distances 242A, 242B by which the offset adjustable point devices 240A, 240B are offset from the boundaries 230A, 230B are not the same. This arrangement permits the guide rail system 220 to be used where the radius "R" is significantly smaller than the critical radius.

As can also be seen in FIGS. 13A and 14A, the guide rail system 220 preferably includes an inner subsystem 232 and an outer subsystem 234. It will be understood that the guide rail system 220 as illustrated in FIGS. 13C, 14B, and 15A-17 also includes the outer subsystem, which is omitted from those views for clarity of illustration.

As will be described, the rail portions 245 preferably are supported by posts. The posts are attached to the adjustment elements 248A, 248B, and 270, which are mounted in adjustable point devices 240A, 240B, and 268 respectively. Preferably, a drive subsystem 276A controls movement of the adjustment elements, and is used to cause the adjustment elements to move in unison, resulting in corresponding movement of the rail portions 245 in unison, as described above in connection with other embodiments of the guide rail system of the invention. The drive subsystem 276A preferably includes a drive element 278A which, when rotated, causes corresponding movement of the adjustment elements, as described above.

In FIG. 13C, a gearbox 209 is shown connected to the drive element 278A. In one embodiment, the drive subsystem 276A preferably includes the gearbox 209 and a handwheel 211 for controlling rotation of the drive element 278A via the gearbox 209. The gearbox 209 is shown as including a counter 213, for counting rotations of the handwheel 211, thereby enabling the operator (not shown) to rotate the drive element 278A a predetermined number of rotations, thereby causing the adjustment elements to move a predetermined distance. As noted above, this mechanism conveniently provides for precise control of the movement of the adjustment elements in unison. (It will be understood that the location of the gearbox and the handwheel in FIG. 13C is for clarity of illustration, as in practice these elements preferably are positioned in a location convenient for the operator.)

An alternative embodiment of the guide rail system 220' is shown in FIG. 13B, which includes an outer subsystem 234'. In the outer subsystem 234', the rail portion(s) are fixed relative to the conveyor 24. (The first and second side subsystems are omitted from FIG. 13B for clarity of illustration.) The guide rail system 220' includes the inner subsystem 232.

Figure 15B:
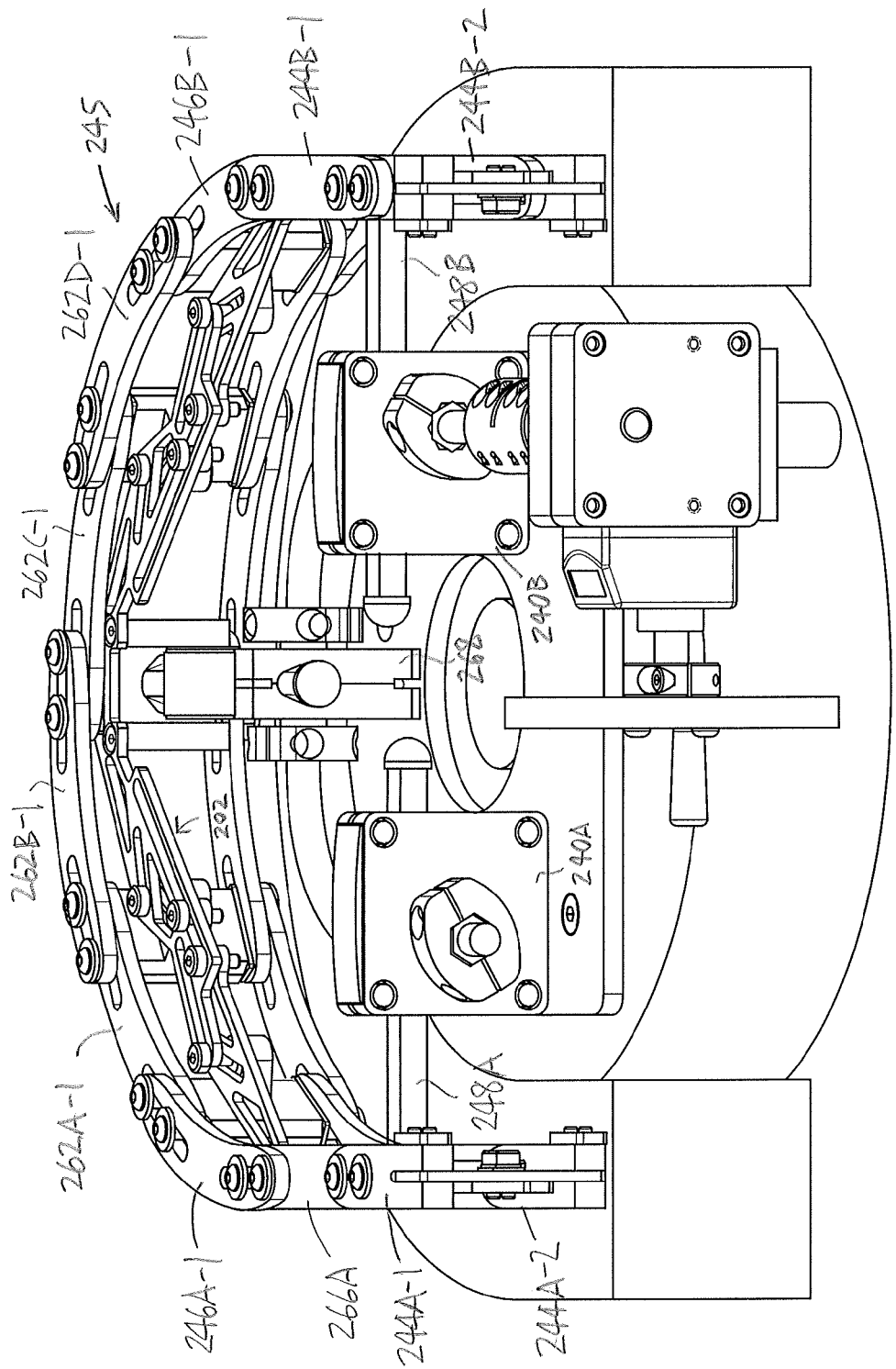
FIG. 15B is an isometric view of the inner subsystem of FIG. 15A.
Figure 15C:
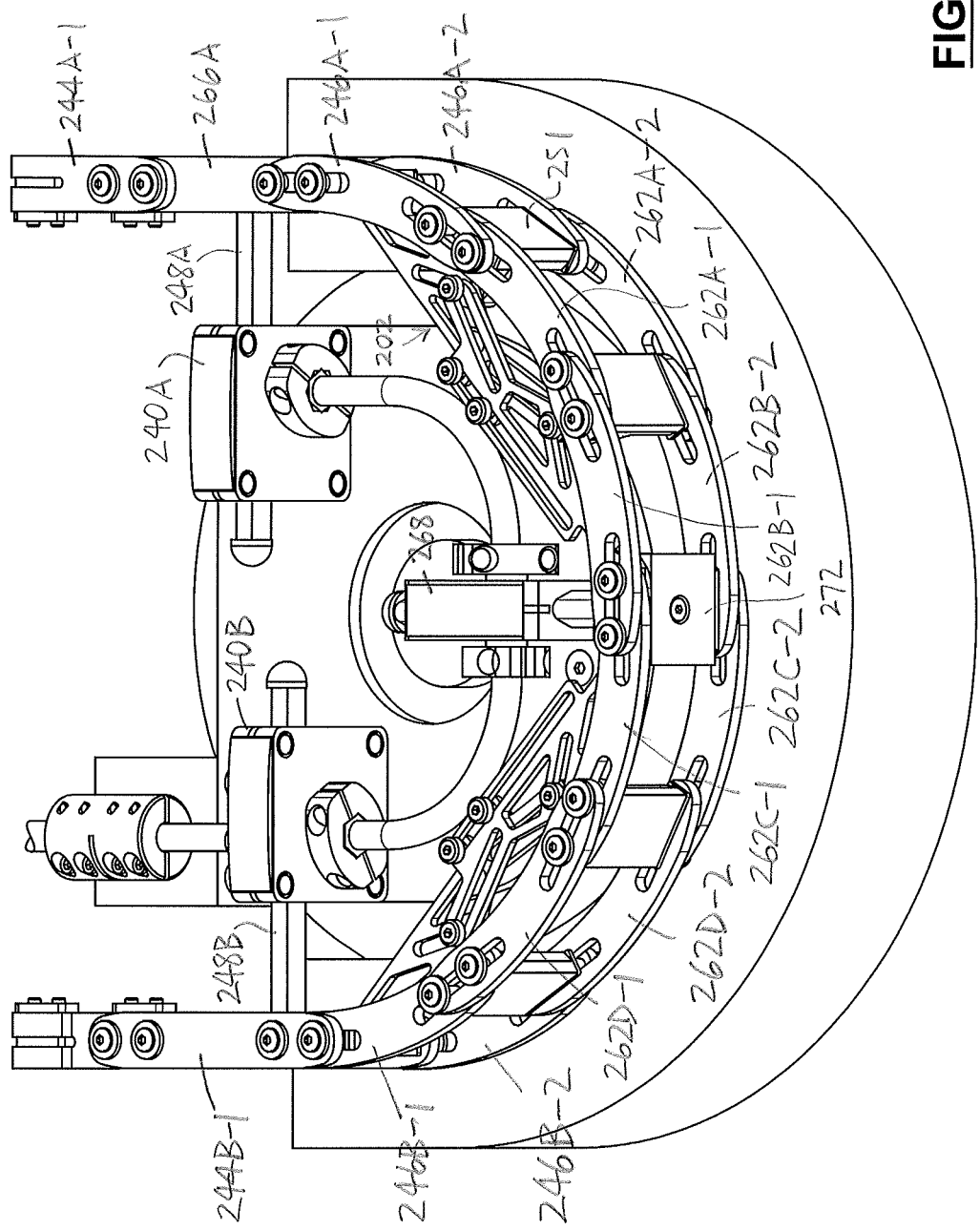
FIG. 15C is another isometric view of the inner subsystem of FIG. 15A.

The rail portions 245 of the guide rail system 220 can best be seen in FIGS. 15B and 15C. As can be seen in FIGS. 15B and 15C, the guide rail system 220 preferably includes first and second transition rail portions 244A-1, 244A-2, 246A-1, 246A-2 mounted to the transition post 266A. It will be understood that first side straight rail portions (not shown in FIGS. 15B, 15C) are omitted for clarity of illustration.

The second transition rail portions 246A-1, 246A-2 overlap at their inner ends with ends of inner slip rail portions 262A-1, 262A-2 respectively. The inner slip rail portions 262A-1, 262A-2 overlap with inner slip rail portions 262B-1, 262B-2 at their other ends respectively. The inner slip rail portions 262B-1, 262B-2 overlap with inner slip rail portions 262C-1, 262C-2 at their other ends respectively. The inner slip rail portions 262C-1, 262C-2 overlap with inner slip rail portions 262D-1, 262D-2 at their other ends respectively.

As can be seen in FIG. 15C, the inner slip rail portions 262D-1, 262D-2 overlap with second transition rail portions 246B-1, 246B-2 at their other ends respectively. The second transition rail portions are slidably attached to the first transition rail portions 244B-1, 244B-2 at their other ends respectively. The first transition rail portions 244B-1, 244B-2 are secured to the transition post 266B.

The support device 202 is shown in more detail in FIGS. 16A and 16B. Those skilled in the art would appreciate that a number of elements of the guide rail system 220 (e.g., the upper inner rail portions, and the upper second transition rail portions) are omitted from FIGS. 16A, 16B, and 17. As can be seen in FIGS. 16A, 16B, and 17, in one embodiment, the support device includes fasteners 231A, 233A, 235A, 237A, 239A, and 241A. The fasteners 231A, 233A fixedly secure the first end 223A of the second bracket 221A to the transition post 266A. As will be described, the fasteners 235A, 237A, 239A, and 241A slidably connect the arm 219A of the first bracket 216 and the second bracket 221A together. The fasteners 243A, 243B fixedly secure the central portion 218 of the first bracket 216 to the central post 272.

As can also be seen in FIGS. 16A, 16B, and 17, the first end 223B of the second bracket 221B is fixedly secured to the transition post 266B by fasteners 231B, 233B. Also, the fasteners 235B, 237B, 239B, and 241B slidably connect the arm 219B of the first bracket 216 and the second bracket 221B together.

In addition to the support device 202 supporting the rail portion 245, the support device 202 also at least partially guides the movement of the rail portion 245, as the rail portion is moved transversely relative to the conveyor 24.

In one embodiment, the guide rail system 220 preferably also includes one or more secured intermediate posts 251 engaged with the rail portion 245 and positioned between the inner post 272 and the transition post 266, for supporting the rail portion 245. It is also preferred that the second bracket 221 is secured to the secured intermediate post 251, to support the secured intermediate post 251 and the rail portion 245, as will be described.

As can be seen in FIG. 17, in one embodiment, the guide rail system 220 preferably includes four secured intermediate posts, identified in FIG. 16A for convenience as 251A-251D. It is also preferred that each of the secured intermediate posts includes an inwardly-projecting ledge 253. For illustrative clarity, the ledges are identified in FIG. 16B as 253A-253D. The second bracket 221A is slidably secured to the ledges 253A, 253B by the fasteners 235A, 241A respectively (FIGS. 16B, 17). Similarly, the second bracket 221B is slidably secured to the ledges 253C, 253D by the fasteners 241B, 235B respectively (FIGS. 16B, 17).

As shown in FIG. 17, the second brackets 221A, 221B are slidably secured to the ledges of the secured intermediate posts because the fasteners extend through slots in the second brackets. For instance, in FIG. 17, it can be seen that the fastener 235A extends through a slot 255A in the second bracket 221A, and the fastener 241A extends through a slot 257A in the second bracket 221A. Similarly, the fasteners 235B, 241B extend through slots 255B, 257B respectively in the second bracket 221B. It will be understood that the fasteners 235A, 241A and the fasteners 235B, 241B permit sliding movement of the second brackets 221A, 221B respectively relative to the secured intermediate posts. In this way, the second brackets 221A, 221B are guided by the fasteners 235A, 241A, and 235B, 241B as the adjustment elements are moved transversely to the conveyor so that the brackets 221A, 221B move with the posts to which they are attached, to support the posts and the rail portions attached thereto.

As can be seen in FIGS. 16B and 17, the fasteners 235A, 241A also extend into slots 269A, 271A respectively that are located in the arm 219A of the first bracket 216 (FIG. 16B). Because of this, the fasteners 235A, 241A also guide the arm 219A as the adjustment elements move the rail portions 245 transversely relative to the conveyor 24. Similarly, the fasteners 241B, 235B, extend into slots 269B, 271B respectively, to guide the movement of the arm 219B (FIG. 16B).

For instance, the positions of the arms 219A, 219B of the first bracket 216 and the second brackets 221A, and 221B relative to each other when the adjustment elements are fully retracted are shown in FIG. 16A, and such elements are also shown with the adjustment elements fully extended, in FIG. 16B. As can be seen in FIGS. 16A and 16B, when the rail portions 245 are moved outwardly, the arm 219A of the first bracket 216 is guided by the fasteners 235A and 241A so that the arm 219A is guided from a first position, in which the fastener 235A is located at a first end 273A of the slot 269A, to a second position, in which the fastener 235A is located at a second end 275A of the slot 269A (FIG. 17). In the same way, and as can also be seen in FIGS. 16A and 16B, the fastener 241A assists in guiding the arm 219A, moving the arm 219A so that the fastener 241A is moved from a first end 277A of the slot 271A to a second end 281A thereof (FIG. 17). It will be understood that the fasteners 241B, 235B function the same as the fasteners 241A, 235A, with no material differences therebetween. Accordingly, further description in this regard is not necessary.

As can be seen in FIG. 17, in one embodiment, the second bracket 221A preferably also includes lugs 283A, 285A. As shown in FIG. 17, the fasteners 237A, 239A preferably are fixedly secured to the lugs 283A, 285A respectively, i.e., in holes 265A, 267A provided for that purpose. The example, the holes 265A, 267A may be threaded, so that correspondingly threaded ends of the fasteners may be threadably engaged therein. Similarly, the second bracket 221B preferably also includes corresponding lugs 283B, 285B in which the fasteners 237B, 239B are fixedly secured, in the same way that the fasteners 237A, 239B are secured to the lugs 283A, 285A.

As can be seen in FIG. 17, when the fasteners 237A, 239A are secured to the lugs 283A, 285A respectively, the fasteners 237A, 239A extend through a slot 203A in the arm 219A of the first bracket 216, i.e., the fasteners 237A, 239A are slidably received therein. It will be understood that the fasteners 237A, 239A permit slidable movement of the arm 219A relative to the fasteners 237A, 239A. Similarly, when the fasteners 237B, 239B are secured to the lugs 283B, 285B respectively, the fasteners 237B, 239B are slidably received in a slot 203B in the arm 219B of the first bracket 216.

From the foregoing, it can be seen that, because the fasteners 237A, 239A are slidably received in the slot 203A and the fasteners 237B, 239B are slidably received in the slot 203B, such fasteners also assist in guiding the movement of the first bracket 216 relative to the second brackets 221A, 221B as the adjustment elements are moved transversely to the conveyor 24. As can be seen in FIGS. 16A and 16B, when the adjustment elements are in the fully retracted positions therefor (FIG. 16A), the fasteners 237A, 239A are located at one end 205A of the slot 203A (FIG. 16B), and when the adjustment elements are in the fully extended positions therefor (FIG. 16B), the fasteners 237A, 239A are located at the other end 207A of the slot 203A (FIG. 16A). As the locations of the fasteners 237B, 239B in the slot 203B also change in the same way with movements of the adjustment elements, no further description thereof is needed.

It will be understood that a number of elements of the guide rail system 220 are omitted from FIG. 17 for clarity of illustration. From the foregoing, and referring to FIGS. 13A-17, it can be seen that the support device 202, being secured to the transition posts 266A, 266B, the central post 272, and the secured intermediate posts, provides support to the rail portions 245 that are attached (i.e., slidably or otherwise) to such posts. When the posts and the rail portions 245 are moved (i.e., due to movement of the adjustment elements), the first bracket 216 and the second brackets 221A, 221B move with them. As described above, the movement of the first and second brackets relative to each other is guided by the fasteners, so that the support device 202 has overall structural integrity as it moves with the posts and rail portions 245.

In use, the first and second brackets are connected to selected posts and guide the movement of the posts when the posts and the rail portions 245 connected thereto are moved transversely relative to the conveyor 24. As described above, due to such guidance provided by the first and second brackets, the brackets remain attached to the posts and also remain indirectly connected with the rail portions, and support the posts and the rail portions.

It will be appreciated by those skilled in the art that the invention can take many forms, and that such forms are within the scope of the invention as described above. The foregoing descriptions are exemplary, and their scope should not be limited to the preferred versions provided therein.

We claim:

1. A guide rail system for guiding containers in preselected positions on at least one conveyor on which the containers are moved, said at least one conveyor comprising at least one straight segment and at least one curved segment substantially aligned with each other at a boundary therebetween, the guide rail system comprising:

inner and outer subsystems for locating the containers on said at least one conveyor positioned proximal to inner and outer sides of the curved segment respectively, the inner subsystem comprising:

at least one offset adjustable point device located at a preselected offset location adjacent to said at least one straight segment and spaced apart from the boundary by a preselected distance;

at least one first transition rail portion mounted to said at least one offset adjustable point device for engaging the containers as they are moved on said at least one straight segment;

at least one second transition rail portion mounted to said at least one offset adjustable point device for engaging the containers as they are moved on said at least one curved segment;

said at least one first transition rail portion and said at least one second transition rail portion being locatable by said at least one offset adjustable point device for engaging the containers, to locate the containers in the preselected positions on said at least one conveyor;

said at least one offset adjustable point device comprising at least one adjustment element transversely movable relative to said at least one conveyor;

each of said at least one first transition rail portion and said at least one second transition rail portion being connected to said at least one adjustment element;

said at least one first transition rail portion comprising at least one first transition rail contact surface, for engagement with the containers;

said at least one second transition rail portion comprises at least one second transition rail contact surface, for engagement with the containers;

at least one first side subsystem being positioned proximal to a first side of said at least one straight segment which is adjacent to the inner side of said at least one curved segment at the boundary line, said at least one first side subsystem comprising at least one first side straight rail portion having a first side rail contact surface for engaging the containers; and the inner subsystem comprising a plurality of inner slip rail portions, each said inner slip rail portion having an inner contact surface for engaging the containers, each said slip rail portion being substantially transversely movable relative to said at least one conveyor.

2. A guide rail system according to claim 1 additionally comprising:

at least one transition post attached to said at least one offset adjustment element;

said at least one first transition rail portion and said at least one second transition rail portion being attached to said at least one transition post;

said at least one transition post being positionable by said at least one offset adjustment element relative to said at least one conveyor to locate said at least one first transition rail portion and said at least one second transition rail portion for engaging said at least one first transition rail contact surface and said at least one second transition rail contact surface respectively with the containers, to locate the containers in the preselected positions on said at least one conveyor.

3. A guide rail system according to claim 2 in which said at least one first transition rail contact surface is at least partially aligned with the first side rail contact surface.

4. A guide rail system according to claim 2 in which said at least one second transition rail contact surface is at least partially aligned with at least a selected one of the inner contact surfaces located adjacent to said at least one second transition rail contact surface.

5. A guide rail system according to claim 1 in which said at least one first transition rail portion, said at least one second transition rail portion, said at least one first side straight rail portion, and the inner slip rail portions are transversely movable relative to said at least one conveyor by at least one selected distance.

6. A guide rail system according to claim 5 in which said at least one first transition rail portion, said at least one second transition rail portion, said at least one first side straight rail portion, and the inner slip rail portions are substantially simultaneously movable relative to said at least one conveyor by said at least one selected distance.

7. A guide rail system according to claim 6 additionally comprising at least one support device for supporting at least a selected one of the inner slip rail portions, said at least one first transition rail portion, and said at least one second transition rail portion.

8. A guide rail system for guiding containers in preselected positions on at least one conveyor along which the containers are moved, said at least one conveyor comprising at least one straight segment and at least one curved segment substantially aligned with each other at a boundary therebetween, the guide rail system comprising:

inner and outer subsystems for locating the containers on said at least one conveyor positioned proximal to inner and outer sides of the curved segment respectively, the inner subsystem comprising:

a plurality of inner slip rail portions, each said inner slip rail portion having an inner contact surface for engaging the containers;

at least one inner adjustable point device to which the inner slip rail portions are mounted;

the inner slip rail portions being locatable by said at least one inner adjustable point device for engaging the inner contact surfaces thereof with the containers, to locate the containers in the preselected positions on said at least one conveyor;

at least one first side subsystem positioned proximal to a first side of said at least one straight segment, the first side being located proximal to the inner side of said at least one curved segment at the boundary line;

said at least one first side subsystem comprising:

at least one first side straight rail portion having a first side rail contact surface for engaging the containers;

at least one first side adjustable point device to which said at least one first side straight rail portion is mounted, said at least one first side straight rail portion being locatable by said at least one first side adjustable point device for engaging the first side rail contact surface with the containers, to locate the containers in the preselected positions on said at least one conveyor;

the inner subsystem additionally comprising:

at least one offset inner adjustable point device located at a preselected offset location adjacent to the first side of said at least one straight segment and spaced apart from the boundary line by a preselected distance along the first side of said at least one straight segment;

at least one first inner transition rail portion having at least one first inner transition rail contact surface for engaging the containers as they move along said at least one straight segment, said at least one first inner transition rail portion being mounted to said at least one offset inner adjustable point device;

at least one second inner transition rail portion having at least one second inner transition rail contact surface for engaging the containers as they move along said at least one curved segment, said at least one second inner transition rail portion being mounted to said at least one offset inner adjustable point device; and each of said at least one first and second inner transition rail portions being locatable by said at least one offset adjustment element for engaging said at least one first inner transition rail contact surface and said at least one second inner transition rail contact surface with the containers, to locate the containers in the preselected positions on said at least one conveyor.

9. A guide rail system according to claim 8 in which each of the inner slip rail portions, said at least one first transition rail portion, said at least one second transition rail portion, and said at least one first side straight rail portion is movable transversely relative to said at least one conveyor by at least one selected distance.

10. A guide rail system according to claim 9 in which the inner slip rail portions, said at least one first transition rail portion, said at least one second transition rail portion, and said at least one first side straight rail portion are substantially simultaneously movable.

11. A guide rail system according to claim 8 in which:
said at least one inner adjustable point device comprises at least one inner adjustment element to which the slip rail portions are connected, said at least one inner adjustment element being transversely movable relative to said at least one conveyor;
said at least one offset inner adjustable point device comprises at least one offset inner adjustment element to which said at least one first inner transition rail portion and said at least one second inner transition rail portion are connected, said at least one offset inner adjustable point device being transversely movable relative to said at least one conveyor; and
said at least one first side adjustable point device comprises at least one first side adjustment element to which said at least one first side rail portion is connected, said at least one first side adjustment element being transversely movable relative to said at least one conveyor.

12. A guide rail system according to claim 11 additionally comprising:
at least one transition post attached to said at least one offset adjustment element;
said at least one first transition rail portion and said at least one second transition rail portion being attached to said at least one transition post;
said at least one transition post being positionable by said at least one offset adjustment element relative to said at least one conveyor to locate said at least one first transition rail portion and said at least one second transition rail portion for engaging said at least one first transition rail contact surface and said at least one second transition rail contact surface respectively with the containers, to locate the containers in the preselected positions thereon; and
at least one inner post connected to said at least one inner adjustment element, the slip rail portions being attached to said at least one inner post.

13. A guide rail system according to claim 12 in which said at least one transition post comprises at least one transition contact surface for engagement with the containers as the containers are moved past the transition post by said at least one conveyor, to locate the containers in the preselected positions thereon.

14. A guide rail system according to claim 13 in which:
said at least one second transition rail portion is slidably attached to said at least one transition post; and said at least one first transition rail portion is fixedly attached to said at least one transition post.

15. A guide rail system according to claim 14 in which said at least one inner adjustment element, said at least one offset adjustment element, and said at least one first side adjustment element are movable substantially in unison with each other relative to said at least one conveyor to position the inner slip rail portions, the first and second inner transition rail portions, and said at least one first side straight rail portion respectively for engaging the inner contact surfaces, said at least one first inner transition rail contact surface and said at least one second inner transition rail contact surface, and the first side straight rail contact surface respectively with the containers, to locate the containers in the preselected positions on said at least one conveyor.

16. A guide rail system according to claim 15 in which the outer subsystem comprises at least one outer rail portion having at least one outer contact surface for engaging the containers, to locate the containers in the preselected positions on said at least one conveyor.

17. A guide rail system according to claim 15 in which the outer subsystem comprises at least one outer slip rail portion having at least one outer slip rail contact surface and positioned to engage said at least one outer slip rail contact surface with the containers as the containers are moved past said at least one outer rail portion by said at least one conveyor, to locate the containers in the preselected positions thereon.

18. A guide rail system according to claim 15 additionally comprising at least one support device for supporting a rail portion selected from the group consisting of at least one of the inner slip rail portions, said at least one second transition rail portion, and combinations thereof.

19. A guide rail system according to claim 18 in which said at least one support device comprises:
a cantilever element comprising:
a base portion;
a movable portion extending between first and second ends thereof, the movable portion being movable relative to the base portion between an extended position, in which the second end is distal to the base portion, and a retracted position, in which the second end is proximal to the base portion;
the base portion being secured to a foundation element; and
the second end of the movable portion being connected to the rail portion such that the cantilever element supports the rail portion.

20. A guide rail system according to claim 19 in which:
the guide rail system additionally comprises at least one midway intermediate post engaged with the rail portion and positioned between said at least one inner post and said at least one transition post, for supporting the rail portion; and
the second end of the movable portion is attached to said at least one midway intermediate post, for supporting said at least one midway intermediate post and the rail portion.

21. A guide rail system according to claim 18 in which said at least one support device comprises:
a first bracket, comprising a central portion thereof secured to said at least one inner post and at least one arm portion extending from the central portion;
at least one second bracket extending between first and second ends thereof, the first end of said at least one second bracket being secured to said at least one transition post; and the second end of said at least one second bracket being slidably secured to said at least one arm of the first bracket, to support the rail portion.

22. A guide rail system according to claim 21 in which:
the guide rail system additionally comprises at least one secured intermediate post engaged with the rail portion and positioned between said at least one inner post and said at least one transition post, for supporting the rail portion; and
said at least one second bracket is secured to said at least one secured intermediate post, to support said at least one intermediate post and the rail portion.

23. A guide rail system for guiding containers along a path having a radius on at least one conveyor to move the containers, said at least one conveyor comprising at least one curved segment for moving the containers along the path, the guide rail system comprising:
an inner subsystem for locating the containers on said at least one conveyor positioned proximal to an inner side of said at least one curved segment, the inner subsystem comprising:
a plurality of inner slip rail portions, each said inner slip rail portion having an inner contact surface for engaging the containers, each said inner slip rail portion being substantially transversely movable relative to said at least one conveyor;
at least one inner adjustable point device to which the inner slip rail portions are mounted;
the inner slip rail portions being locatable by said at least one inner adjustable point device to position the inner contact surfaces thereof substantially parallel to the path for engagement thereby with the containers, to guide the containers along the path;
said at least one inner adjustable point device including an inner adjustment element mounted thereto, the inner slip rail portions being connected to said at least one inner adjustable point device via the inner adjustment element; and
the inner adjustment element being movable substantially orthogonally relative to the path, to move the inner slip rail portions at least one selected distance relative to the conveyor.

24. A guide rail system according to claim 23 in which the inner slip rail portions are movable by said at least one inner adjustable point device substantially orthogonally relative to the path.

25. A guide rail system according to claim 23 additionally comprising an outer subsystem, the outer subsystem comprising:
a plurality of outer slip rail portions, each said outer slip rail portion having an outer contact surface for engaging the containers, each said outer slip rail portion being substantially transversely movable relative to said at least one conveyor;
at least one outer adjustable point device to which the outer slip rail portions are mounted;
the outer slip rail portions being locatable by said at least one outer adjustable point device to position the outer contact surfaces thereof substantially parallel to the path for engagement thereby with the containers, to guide the containers along the path;
said at least one outer adjustable point device including an outer adjustment element mounted therein, to which the outer slip rail portions are connected; and
the outer adjustment element being movable substantially orthogonally relative to the path, to move the outer slip rail portions transversely relative to the conveyor by at least one selected distance.

26. A guide rail system according to claim 25 in which the outer slip rail portions are movable by said at least one outer adjustable point device substantially orthogonally relative to the path.

27. A guide rail system for guiding containers along a path having a radius on at least one conveyor to move the containers, the radius extending between a center point thereof and the path, said at least one conveyor comprising at least one curved segment for moving the containers along the path, the guide rail system comprising:
an inner subsystem for locating the containers on said at least one conveyor positioned proximal to an inner side of said at least one curved segment, the inner subsystem comprising:
a plurality of inner slip rail portions, each said inner slip rail portion having an inner contact surface for engaging the containers, each said inner slip rail portion being substantially transversely movable relative to said at least one conveyor;
at least one inner adjustable point device to which the inner slip rail portions are mounted;
the inner slip rail portions being locatable by said at least one inner adjustable point device to position the inner contact surfaces thereof substantially parallel to the path for engagement thereby with the containers, to guide the containers along the path;
said at least one inner adjustable point device including an inner adjustment element mounted thereto, the inner slip rail portions being connected to said at least one inner adjustable point device via the inner adjustment element; and
the inner adjustment element being substantially aligned with the center point and movable transversely relative to the conveyor, to move the inner slip rail portions at least one selected distance transversely relative to the conveyor.

28. A guide rail system according to claim 27 in which the inner adjustment element is movable by said at least one inner adjustable point device substantially orthogonal to the path.

29. A guide rail system according to claim 27 additionally comprising an outer subsystem, the outer subsystem comprising:
a plurality of outer slip rail portions, each said outer slip rail portion having an outer contact surface for engaging the containers, each said outer slip rail portion being substantially transversely movable relative to said at least one conveyor;
at least one outer adjustable point device to which the outer slip rail portions are mounted;
the outer slip rail portions being locatable by said at least one outer adjustable point device to position the outer contact surfaces thereof substantially parallel to the path for engagement thereby with the containers, to guide the containers along the path;
said at least one outer adjustable point device including an outer adjustment element mounted therein, to which the outer slip rail portions are connected; and
the outer adjustment element being substantially aligned with the center point and movable transversely relative to the conveyor, to move the outer slip rail portions transversely relative to the conveyor by at least one selected distance.

30. A guide rail system according to claim 29 in which the outer adjustment element is movable by said at least one outer adjustable point device substantially orthogonal to the path.

\* \* \* \* \*